(12) United States Patent
Ahn et al.

(10) Patent No.: US 11,592,720 B2
(45) Date of Patent: Feb. 28, 2023

(54) DISPLAY DEVICE

(71) Applicant: Samsung Display Co., Ltd., Yongin-Si (KR)

(72) Inventors: Si Hyun Ahn, Hwaseong-si (KR); Na Hyeon Cha, Yongin-si (KR); Sun Kwun Son, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/829,470

(22) Filed: Jun. 1, 2022

(65) Prior Publication Data

US 2022/0299811 A1 Sep. 22, 2022

Related U.S. Application Data

(62) Division of application No. 17/078,024, filed on Oct. 22, 2020, now Pat. No. 11,372,301.

(30) Foreign Application Priority Data

Jan. 7, 2020 (KR) ........................ 10-2020-0001865

(51) Int. Cl.
  *G02F 1/1368* (2006.01)
  *G02F 1/1343* (2006.01)
  *G02F 1/1362* (2006.01)

(52) U.S. Cl.
  CPC ...... *G02F 1/1368* (2013.01); *G02F 1/134309* (2013.01); *G02F 1/136286* (2013.01); *G02F 1/136218* (2021.01); *G02F 2201/123* (2013.01)

(58) Field of Classification Search
  CPC ............ G02F 1/136286; G02F 1/1368; G02F 1/136295; G02F 1/136218; G09G 3/3648;
  (Continued)

(56) References Cited

U.S. PATENT DOCUMENTS 10,473,994 B2  11/2019  Yeh et al.
2014/0375534 A1* 12/2014  Lee ..................... G09G 3/3648
                                                            345/87
(Continued)

FOREIGN PATENT DOCUMENTS

CN         105446029 A    3/2016
JP          6465964 B2    2/2019
(Continued)

*Primary Examiner* — Mariam Qureshi
(74) *Attorney, Agent, or Firm* — Innovation Counsel LLP

(57) ABSTRACT

A display device includes a first conductive layer including horizontal scan lines, and island-type electrodes, which are spaced apart from the horizontal scan lines; a first insulating layer disposed on the first conductive layer; a second conductive layer disposed on the first insulating layer, the second conductive layer including data lines, and a plurality of vertical scan lines; a second insulating layer disposed on the second conductive layer; and a third conductive layer disposed on the second insulating layer and including first shield electrodes, which cover first edges of the vertical scan lines, and second shield electrodes, which are spaced apart from the first shield electrodes, and cover second edges of the vertical scan lines, wherein the vertical scan lines are electrically connected to the island-type electrodes via contact holes that extend through the first insulating layer.

6 Claims, 22 Drawing Sheets

(58) Field of Classification Search
CPC ... G09G 2300/0426; G09G 2310/0281; G09G 3/3659; G09G 3/3677; G09G 2310/0262; G09G 2300/0408; G09G 2330/06; H01L 27/3276; H01L 27/3279; H01L 51/445
See application file for complete search history.

(56) References Cited

U.S. PATENT DOCUMENTS

2015/0185929 A1* 7/2015 Xu .................. G06F 3/0412
                                                       345/173
2018/0081245 A1* 3/2018 Xiao ............. G02F 1/136286

FOREIGN PATENT DOCUMENTS

| KR | 10-2016-0093153 A | 8/2016 |
|---|---|---|
| KR | 10-2052741 B1 | 12/2019 |

* cited by examiner

Fig. 6
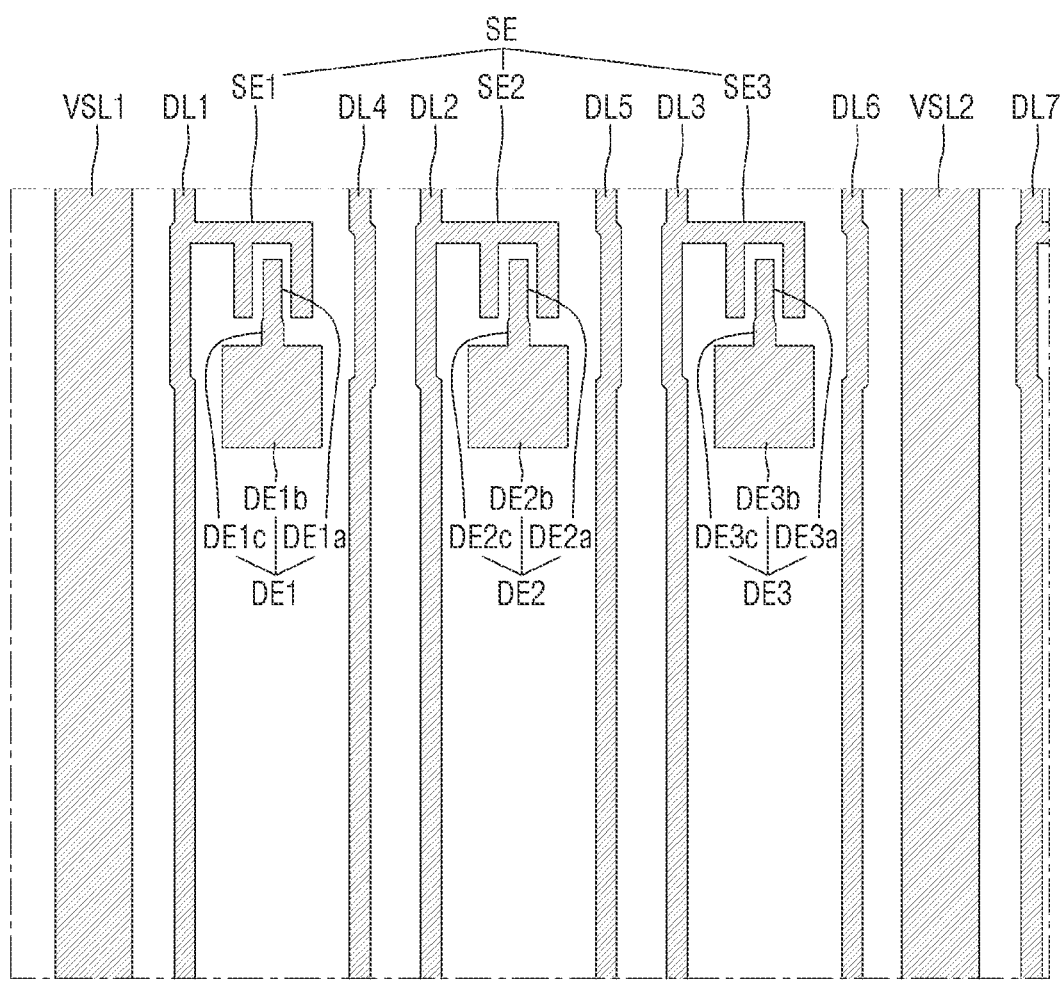
VSL : VSL1,VSL2
DL : DL1,DL2,DL3,DL4,DL5,DL6
DE : DE1,DE2,DE3
170 : DE,DL,SE,VSL
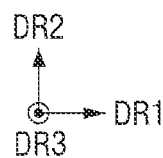

DISPLAY DEVICE

This application is a divisional application of U.S. patent application Ser. No. 17/078,024 filed on Oct. 22, 2020, which claims priority to Korean Patent Application No. 10-2020-0001865, filed on Jan. 7, 2020, and all the benefits accruing therefrom under 35 U.S.C. § 119, the disclosures of which are incorporated herein by reference in their entirety.

BACKGROUND

1. Field

The present disclosure relates to a display device.

2. Description of the Related Art

Display devices have increasingly become of importance with the development of multimedia, and various types of display devices, such as an organic light-emitting diode (OLED) display and a liquid crystal display (LCD), have been used. The application of display devices have diversified, ranging from various mobile electronic devices such as portable electronic devices, e.g., a smartphone, a smartwatch, and a tablet personal computer (PC).

There exists an area on the outside of a glass substrate of a display device where drive integrated circuits (ICs) or other printed circuits are installed, and this area is a non-display area where no image is displayed and may be referred to as a bezel.

SUMMARY

Embodiments of the present disclosure provide a display device having a source driver and a gate driver attached on one side of a display panel of the display device and thus providing a small non-display area.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

An embodiment of a display device includes a first conductive layer including horizontal scan lines, which extend in a first direction, and island-type electrodes, which extend in a second direction that intersects the first direction and are spaced apart from the horizontal scan lines. A first insulating layer is disposed on the first conductive layer. A second conductive layer is disposed on the first insulating layer. The second conductive layer includes data lines, which extend in the second direction, and vertical scan lines, which extend in the second direction. A second insulating layer is disposed on the second conductive layer. A third conductive layer is disposed on the second insulating layer and includes first shield electrodes, which extend in the second direction and cover first edges of the vertical scan lines, and second shield electrodes, which extend in the second direction, are spaced apart from the first shield electrodes, and cover second edges of the vertical scan lines. The vertical scan lines are electrically connected to the island-type electrodes via contact holes that extends through the first insulating layer.

An embodiment of a display device includes first and second horizontal scan lines extending in a first direction. A first vertical scan line extends in a second direction that intersects the first direction. First, second, third, and fourth data lines extend in the second direction, and are sequentially arranged along the first direction. A first switching element is connected to the first horizontal scan line and the first data line. A second switching element is connected to the first horizontal scan line and the third data line. A third switching element is connected to the second horizontal scan line and the second data line. A fourth switching element is connected to the second horizontal scan line and the fourth data line. A first pixel electrode is connected to the first switching element. A second pixel electrode is connected to the second switching element. A third pixel electrode is connected to the third switching element. A fourth pixel electrode is connected to the fourth switching element. Island-type electrodes extend in the second direction, are disposed in the same layer as the first and second horizontal scan lines, and overlap with the first vertical scan line in a thickness direction. A first shield electrode extends in the second direction and covers a first edge of the first vertical scan line. A second shield electrode is spaced apart from the first shield electrode and covers a second edge of the first vertical scan line. The first vertical scan line electrically connects the first horizontal scan line and the second horizontal scan line.

According to the aforementioned and other embodiments of the present disclosure, a source driver and a gate driver are attached on one side of a display panel. Therefore, a display device having a small non-display area is provided.

Other features and embodiments may be apparent from the following detailed description, the drawings, and the claims.

BRIEF DESCRIPTION OF THE DRAWINGS

The above and other embodiments and features of the present disclosure will become more apparent by describing in detail embodiments with reference to the attached drawings.

FIG. 6 is a layout view illustrating a data conductive layer of FIG. 4.

DETAILED DESCRIPTION

The inventive concept will now be described more fully hereinafter with reference to the accompanying drawings, in which embodiments are shown. This inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below can be termed a second element, component, region, layer or section without departing from the teachings of the inventive concept.

Hereinafter, specific embodiments will be described with reference to the accompanying drawings.

Figure 1:
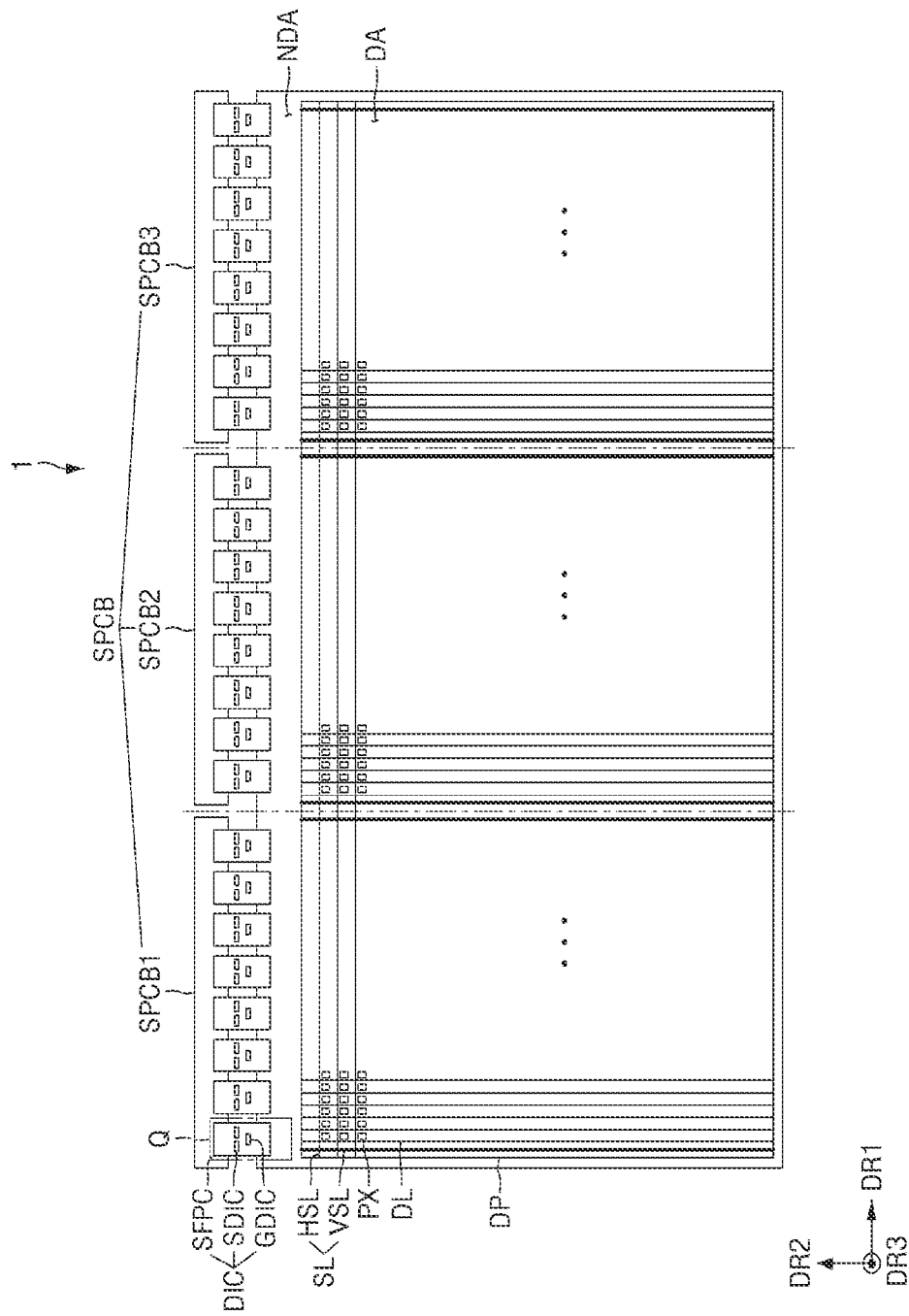
FIG. 1 is a plan view of a display device according to an embodiment of the present disclosure.
Figure 2:
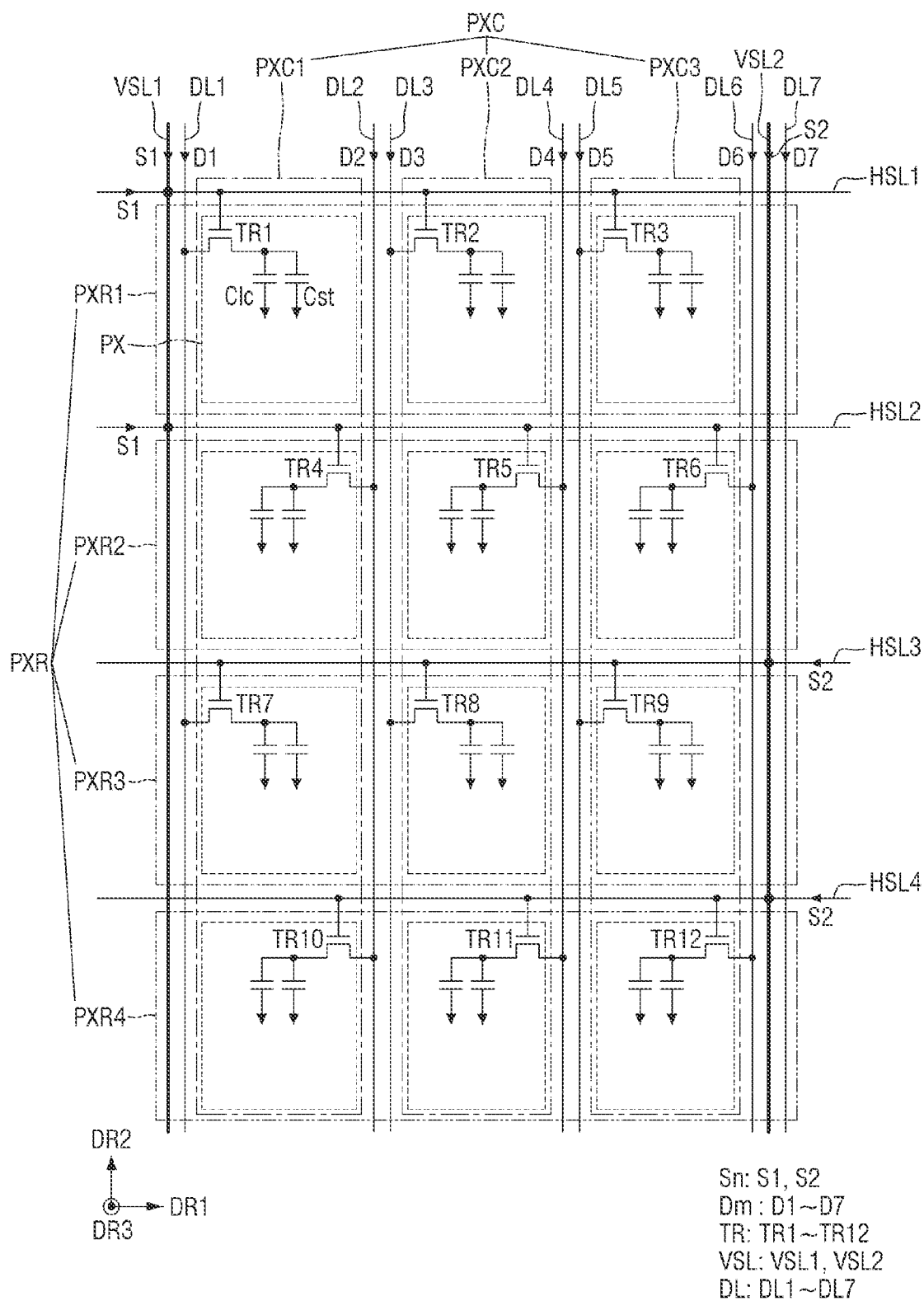
FIG. 2 is an equivalent circuit diagram of some pixels of FIG. 1.
Figure 3:
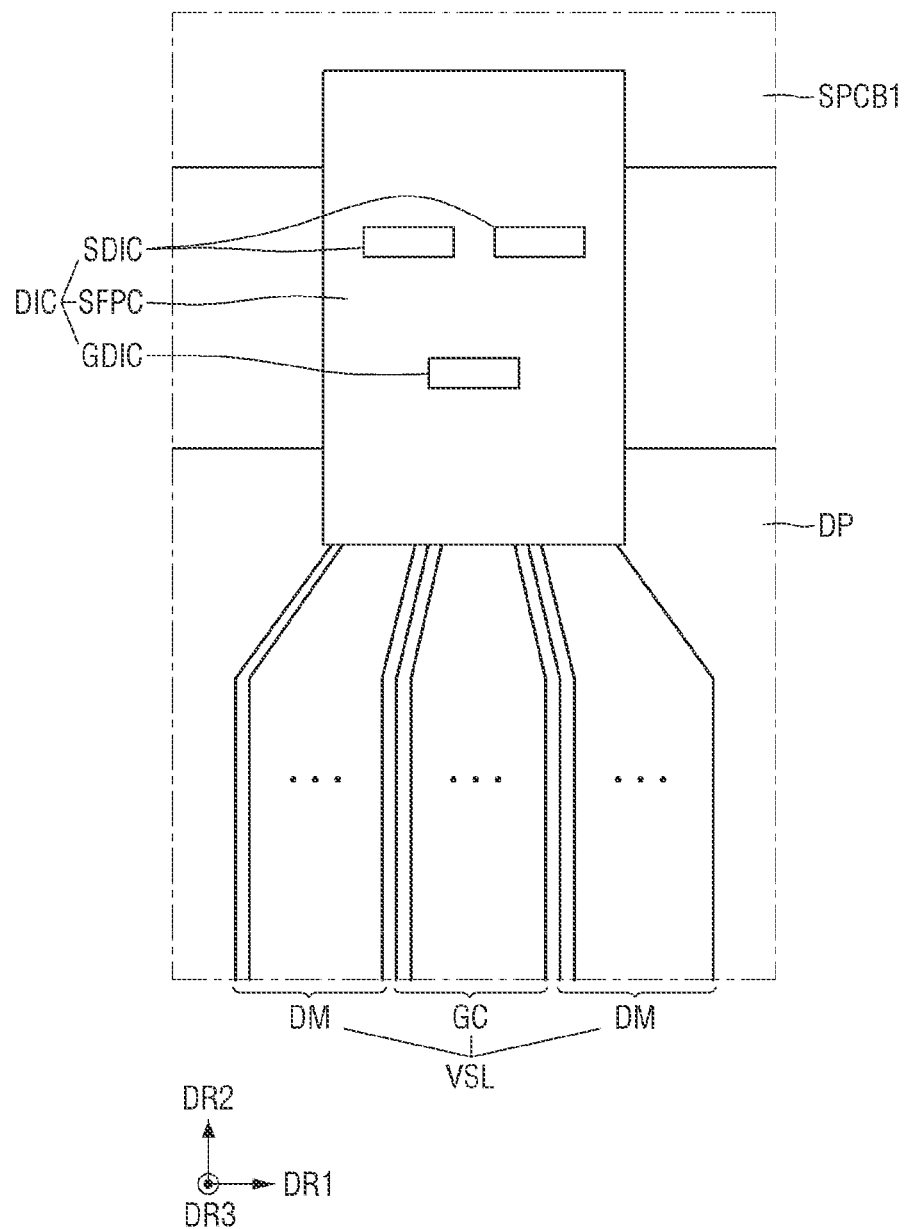
FIG. 3 is an enlarged plan view illustrating an area Q of FIG. 1.

FIG. 1 is a plan view of a display device 1 according to an embodiment of the present disclosure. FIG. 2 is an equivalent circuit diagram of some pixels of FIG. 1. FIG. 3 is an enlarged plan view illustrating an area Q of FIG. 1.

The display device 1 will hereinafter be described as being, for example, a liquid crystal display (LCD) including a liquid crystal layer.

The display device 1 may be applied to large-sized electronic devices, e.g., televisions (TVs) or external billboards, and small and middle-sized electronic devices, e.g., personal computers, notebook computers, car navigation units, or cameras. The display device 1 may also be applied to a tablet personal computer (tablet PC), a smartphone, a personal digital assistant (PDA), a portable multimedia player (PMP), a game console, a watch-type electronic device, and/or some other form of electronic device. All these electronic devices are provided as examples, and the display device 1 may also be applied to other electronic devices without departing the spirit and scope of the inventive concepts of the present disclosure.

Referring to FIGS. 1 through 3, the display device 1 may have a display area DA and a non-display area NDA defined on the display device 1, and the non-display area NDA may be disposed around the display area DA. The display area DA may be located in the middle of the display device 1, and the non-display area NDA may be located on the edges of the display device 1 and may surround the display area DA. The display area DA may be a region where an image is displayed, and the non-display area NDA may be a region where no image is displayed.

Pixels PX may be disposed in the display area DA. The pixels PX may be arranged in a matrix in a first direction DR1 and in a second direction DR2, which intersects the first direction DR1. The first and second directions DR1 and DR2 may be perpendicular to each other and define a plane, and a third direction DR3 may be normal to the plane. The display device 1 may have a rectangular shape in a plan view, but the planar shape of the display device 1 is not particularly limited. That is, the display device 1 may have a square shape, another polygonal shape, a circular shape, or an elliptical shape in a plan view. In a case where the display device 1 has a rectangular shape in a plan view, the first direction DR1 may be the direction of the long sides of the display device 1, and the second direction DR2 may be the direction of the short sides of the display device 1.

In some embodiments, the display device 1 may be applied in a public information display (PID) or a tiled display (TD). Specifically, multiple display devices 1 may be arranged in a tiled display in such a manner that the long sides or the short sides of each of the multiple display devices 1 may be connected. Some of the multiple display devices 1 may form one side of the tiled display, some of the multiple display devices 1 may be located at the corners of the tiled display to form adjacent two sides of the tiled display, and some of the multiple display devices 1 may be disposed on the inside of the tiled display to be surrounded by other display devices 1. The multiple display devices 1 may have different bezel shapes depending on their location in the tiled display or may have the same bezel shape.

The multiple display devices 1 may be arranged in a lattice shape. The multiple display devices 1 may be connected to one another in the first direction DR1, may be connected in the second direction DR2, or may be connected to form a particular shape. The multiple display devices 1 may have the same size. Alternatively, the multiple display devices 1 may have different sizes.

The tiled display may be a flat display. Alternatively, the tiled display may have a three-dimensional (3D) shape to provide a 3D effect. In a case where the tiled display has a 3D shape, each of the multiple display devices 1 in the tiled display may have a curved shape. Alternatively, the multiple display devices 1 may have a flat shape and may be connected to one another at a predetermined angle to form a 3D tiled display. The multiple display devices 1 may be connected so that their bezels may adjoin one another, or may be connected via connecting members.

Embodiments of a display device 1 that can be used alone as a single display will hereinafter be described.

The display device 1 may include a display panel DP, driving controllers SPCB, which are disposed on one side of the display panel DP, and integrated drivers DIC, which are connected to the driving controllers SPCB.

The display panel DP may display an image using a scan signal Sn, where n is an integer of 1 or greater, and a data signal Dm, where m is an integer of 1 or greater.

Horizontal scan lines HSL, which extend in the first direction DR1, data lines DL, which extend in the second direction DR2, and vertical scan lines VSL, which also extend in the second direction DR2, may be disposed on the display panel DP. The vertical scan lines VSL may be disposed to be spaced apart from, and in parallel to, the data lines DL. Some vertical scan lines VSL, particularly, gate channels GC of FIG. 3, may be connected to the horizontal scan lines HSL. Here, the expression "connection", as used herein, not only means physical connection, but also encompasses electrical connection. The vertical scan lines VSL and the horizontal scan lines HSL may be placed in contact and may be connected. That is, the vertical scan lines VSL and the horizontal scan lines HSL may be electrically connected in manners other than that set forth herein. The pixels PX may be disposed at the intersections between the horizontal scan lines HSL and the data lines DL. The data lines DL and the vertical scan lines VSL may be formed at the same time by a single mask process, but the horizontal scan lines HSL may be formed by a different mask process from the data lines DL and the vertical scan lines VSL.

Pixel columns may be disposed between a pair of adjacent vertical scan lines VSL, for example, between first and second vertical scan lines VSL1 and VSL2. For example, three pixel columns, i.e., first, second, and third pixel columns PXC1, PXC2, and PXC3, which extend in the second direction DR2, may be disposed between the first and second vertical scan lines VSL1 and VSL2, and six data lines DL, i.e., first, second, third, fourth, fifth, and sixth data lines DL1, DL2, DL3, DL4, DL5, and DL6, may be disposed between the first and second vertical scan lines VSL1 and VSL2.

Each of the gate channels GC, which are vertical scan lines VSL connected to the horizontal scan lines HSL, may electrically connect two horizontal scan lines HSL. For example, the first vertical scan line VSL1 may connect first and second horizontal scan lines HSL1 and HSL2, and the second vertical scan line VSL2 may connect third and fourth horizontal scan lines HSL3 and HSL4. Thus, the same scan signals may be applied to pairs of horizontal scan lines HSL electrically connected by the vertical scan lines VSL. For example, a first scan signal S1 may be applied to both the first and second horizontal scan lines HSL1 and HSL2 at the same time from the first vertical scan line VSL1, and a second scan signal S2 may be applied to both the third and fourth horizontal scan lines HSL3 and HSL4 at the same time from the second vertical scan line VSL2. Thus, each of the vertical scan lines VSL may electrically connect two horizontal scan lines HSL in the display area DA.

The horizontal scan lines HSL may be connected to pixel rows PXR adjacent to the horizontal scan lines HSL in the second direction DR2. The horizontal scan lines HSL may be disposed between the pixel rows PXR. Also, the pixel rows PXR may be disposed between the horizontal scan lines HSL. The number of horizontal scan lines HSL may be generally the same as the number of pixel rows PXR.

The first, second, third, and fourth horizontal scan lines HSL1, HSL2, HSL3, and HSL4 may be sequentially arranged along the second direction DR2. The first horizontal scan line HSL1 may be connected to a first pixel row PXR1. The second horizontal scan line HSL2 may be connected to a second pixel row PXR2. The third horizontal scan line HSL3 may be connected to a third pixel row PXR3. The fourth horizontal scan line HSL4 may be connected to a fourth pixel row PXR4.

The data lines DL may be disposed to overlap with the pixel columns PXC, on first and second sides, e.g., the right and left sides, in the first direction DR1, of each of the pixel columns PXC. For example, a first data line DL1 may be disposed on a second side, in the first direction DR1, of the first pixel column PXC1, and a second data line DL2 may be disposed on a first side, in the first direction DR1, of the first pixel column PXC1. For example, a third data line DL3 may be disposed on a second side, in the first direction DR1, of the second pixel column PXC2, and a fourth data line DL4 may be disposed on a first side, in the first direction DR1, of the second pixel column PXC2. For example, a fifth data line DL5 may be disposed on a second side, in the first direction DR1, of the third pixel column PXC3, and a sixth data line DL6 may be disposed on a first side, in the first direction DR1, of the third pixel column PXC3. Two data lines DL may be disposed on both sides, in the first direction DR1, of each of the pixel columns PXC. That is, the number of data lines DL may be twice the number of pixel columns PXC.

A seventh data line DL7 may be disposed on a first side, in the first direction DR1, of the sixth data line DL6 with the second vertical scan line VSL2 interposed between the seventh data line DL7 and the sixth data line DL6. The seventh data line DL7 may provide the data signal Dm to the pixel column PXC disposed on a first side, in the first direction DR1, of the second vertical scan line VSL2.

In the pixels PX, which form the pixel rows PXR and the pixel columns PXC, switching elements, TR1 through TR12), which are connected to the horizontal scan lines HSL and the data lines DL, may be disposed. The switching elements TR1 through TR12 may be formed as thin-film transistors (TFTs). Each of the TFTs may include a gate electrode GE, a source electrode SE, and a drain electrode DE. The switching elements TR1 through TR12 may be connected to the horizontal scan lines HSL and the data lines DL. Specifically, the gate electrodes GE of the switching elements TR1 through TR12 may be connected to the horizontal scan lines HSL, and the source electrodes SE of the switching elements TR1 through TR12 may be connected to the data lines DL.

For example, the first horizontal scan line HSL1 and the first data line DL1 may be connected to the first switching element TR1. The first horizontal scan line HSL1 and the third data line DL3 may be connected to the second switching element TR2. The first horizontal scan line HSL1 and the fifth data line DL5 may be connected to the third switching element TR3. The second horizontal scan line HSL2 and the second data line DL2 may be connected to the fourth switching element TR4. The second horizontal scan line HSL2 and the fourth data line DL4 may be connected to the fifth switching element TR5. The second horizontal scan line HSL2 and the sixth data line DL6 may be connected to the sixth switching element TR6. The third horizontal scan line HSL3 and the first data line DL1 may be connected to the seventh switching element TR7. The third horizontal scan line HSL3 and the third data line DL3 may be connected to the eighth switching element TR8. The third horizontal scan line HSL3 and the fifth data line DL5 may be connected to the ninth switching element TR9. The fourth horizontal scan line HSL4 and the second data line DL2 may be connected to the tenth switching element TR10. The fourth horizontal scan line HSL4 and the fourth data line DL4 may be connected to the eleventh switching element TR11. The fourth horizontal scan line HSL4 and the sixth data line DL6 may be connected to the twelfth switching element TR12.

A storage capacitor Cst and a liquid crystal capacitor Clc may be connected to each of the switching elements TR1 through TR12.

The driving controllers SPCB and the integrated drivers DIC may form a power source for displaying an image on the display panel DP and a driving unit for providing multiple signals.

The integrated drivers DIC may generate the scan signal Sn using scan control signals and may generate the data signal Dm using data control signals and image data. The scan signal Sn, which is generated by the integrated drivers DIC, may be sequentially provided to the horizontal scan lines HSL via the vertical scan lines VSL of the display panel DP. The data signal Dm, which is generated by the integrated drivers DIC, may be provided to the data lines DL of the display panel DP.

Each of the integrated drivers DIC may be implemented as a chip-on-film (COF) including a flexible printed circuit board (FPCB) SFPC, which includes multiple wires and are connected to the display panel DP and one of the driving controllers SPCB, and a first integrated circuit GDIC and second integrated circuits SDIC, which are mounted on the flexible printed circuit boards SFPC, and may be connected to one side of the display panel DP.

The first integrated circuit GDIC may include a shift register and may generate the scan signal Sn. The second integrated circuits SDIC may include digital-to-analog converters (DACs) and may generate the data signal Dm.

One first integrated circuit GDIC and two second integrated circuits SDIC may be disposed on the flexible printed circuit board SFPC. The first integrated circuit GDIC may be disposed on first sides, in the second direction DR2, of the second integrated circuits SDIC, and the second integrated circuits SDIC may be disposed on a second side, in the second direction DR2, of the first integrated circuit GDIC. The second integrated circuits SDIC may be symmetrical with respect to a line that divides the flexible printed circuit board SFPC in halves and is parallel to the second direction DR2.

Multiple connecting lines, which extend toward the display panel DP, may be disposed on each of the integrated drivers DIC. The connecting lines may include first connecting lines, which extend from the first integrated circuit GDIC of each of the integrated drivers DIC and are connected to the gate channels GC of the vertical scan lines VSL, and second connecting lines, which extend from the second integrated circuits SDIC of each of the integrated drivers DIC and are connected to the data lines DL. The number of first connecting lines disposed on each of the integrated drivers DIC to extend from a single first integrated circuit GDIC may be 270, and the number of second connecting lines disposed on each of the integrated drivers DIC to extend from each second integrated circuit SDIC may be 960. Thus, the total number of second connecting lines disposed on each of the integrated drivers DIC may be 1920, i.e., 960×2.

In a region on the display panel DP, covered by each integrated driver DIC, vertical scan lines VSL and data lines DL may be disposed to extend in the second direction DR2.

In the region covered by each integrated driver DIC, the vertical scan lines VSL may include an array of gate channels GC, which are disposed in the middle, and dummy lines DM, which are disposed on first and second sides, in the first direction DR1, of the array of the gate channels GC.

The gate channels GC may be vertical scan lines VSL that are connected to the horizontal scan lines HSL and to which the scan signal Sn is applied. The gate channels GC may be in direct contact with, and connected to the horizontal scan lines HSL. The dummy lines DM may be wires to which a gate-off voltage Voff or a common voltage Vcom, instead of the scan signal Sn, is applied. The dummy lines DM may not be connected to the horizontal scan lines HSL. The gate channels GC and the dummy lines DM may include the same material.

As described above, the gate channels GC may be connected to a first integrated circuit GDIC of the integrated driver DIC. Thus, the number of gate channels GC may be the same as the number of first connecting lines. The dummy lines DM may not be connected to the first integrated circuit GDIC.

In the region covered by each integrated driver DIC, the number of vertical scan lines VSL may be the same as the sum of the number of gate channels GC and the number of dummy lines DM. For example, if there are 270 first connecting lines on each integrated driver DIC, 270 gate channels GC, 50 dummy lines DM, and 320 vertical scan lines VSL may be disposed in the region covered by the corresponding integrated driver DIC.

In this case, half the dummy lines DM may be disposed on the first side, in the first direction DR1, of the array of the gate channels GC, and the other half may be disposed on the second side, in the first direction DR1, of the array of the gate channels GC. That is, 25 dummy lines DM may be disposed on the first side, in the first direction DR1, of the array of the gate channels GC, and 25 dummy lines DM may be disposed on the second side, in the first direction DR1, of the array of the gate channels GC.

The data lines DL may be connected to second integrated circuits SDIC of each integrated driver DIC via second connecting lines. Thus, in the region covered by each integrated driver DIC, the number of data lines DL may be the same as the number of second connecting lines disposed on the corresponding integrated driver DIC. For example, if two second integrated circuits SDIC are disposed on each integrated driver DIC and 960 second connecting lines extend from each of the two second integrated circuits SDIC, the number of data lines DL disposed in the region covered by the corresponding integrated driver DIC may be 1920.

The vertical scan lines VSL may be disposed to be spaced apart from one another. The distance between the vertical scan lines VSL may be uniform, but may vary from one region to another region. Pixels PX and data lines DL may be disposed between each pair of adjacent vertical scan lines VSL. Two data lines DL may be disposed, one on each side of each pixel column PXC. Thus, the number of data lines DL may be twice the number of pixel columns PXC. In the display device 1, three pixel columns PXC and six data lines DL may be disposed between each pair of adjacent vertical scan lines VSL. The number of data lines DL may be six times the number of vertical scan lines VSL.

The driving controllers SPCB may generate gate control signals, data control signals, and image data using an image signal and multiple timing signals, received from an external system, and may provide the gate control signals, the data control signals, and the image data to the integrated drivers DIC.

For example, the driving controllers SPCB may include a timing controller, the multiple timing signals may include a data enable (DE) signal, a horizontal synchronization (HSY) signal, a vertical synchronization (VSY) signal, and a clock (CLK), the scan control signals may include a gate start pulse (GSP), a gate shift clock (GSC), and a gate output enable (GOE) signal, and the data control signals may include a source start pulse (SSP), a source sampling clock (SSC), and a source output enable (SOE) signal.

Since the scan signal Sn is transmitted to the horizontal scan lines HSL via the vertical scan lines VSL, the path of the transmission of the scan signal Sn may undesirably be elongated, and as a result, the scan signal SN may be attenuated and/or delayed. In order to prevent the attenuation and/or the delay of scan signal SN, the display panel DP may be divided along the first direction DR1 into sections and may be driven using different driving controllers SPCB in different sections. For example, the display panel DP may be divided along the first direction DR1 into three different sections, and different driving controllers SPCB may be provided in the three different sections.

The driving controllers SPCB may be printed circuit boards (PCBs) that are connected to the integrated drivers DIC. The driving controllers SPCB will hereinafter be described, taking, as an example, three driving controllers including three PCBs, i.e., first, second, and third driving controllers SPCB1, SPCB2, and SPCB3.

Three PCBs may be connected to correspond to the three sections of the display panel DP. For example, the first, second, and third driving controllers SPCB1, SPCB2, and SPCB3 may be connected to the three sections of the display panel DP. Eight integrated drivers DIC may be connected to each of the first, second, and third driving controllers SPCB1, SPCB2, and SPCB3.

The display panel DP may include the display area DA, which is used to display an image, and the non-display area NDA, which is not used to display an image.

Since the integrated drivers DIC are connected to one side of the display panel DP and the scan signal Sn, which is generated by the integrated drivers DIC, is transmitted to the horizontal scan lines HSL via the vertical scan lines VSL, pads for connection to a gate driver or multiple wires for providing the gate control signals and the scan signal Sn may not be disposed in the non-display area NDA. Thus, the size of the non-display area NDA of the display panel DP can be minimized, and as a result, a narrow-bezel display device 1 can be provided.

Figure 4:
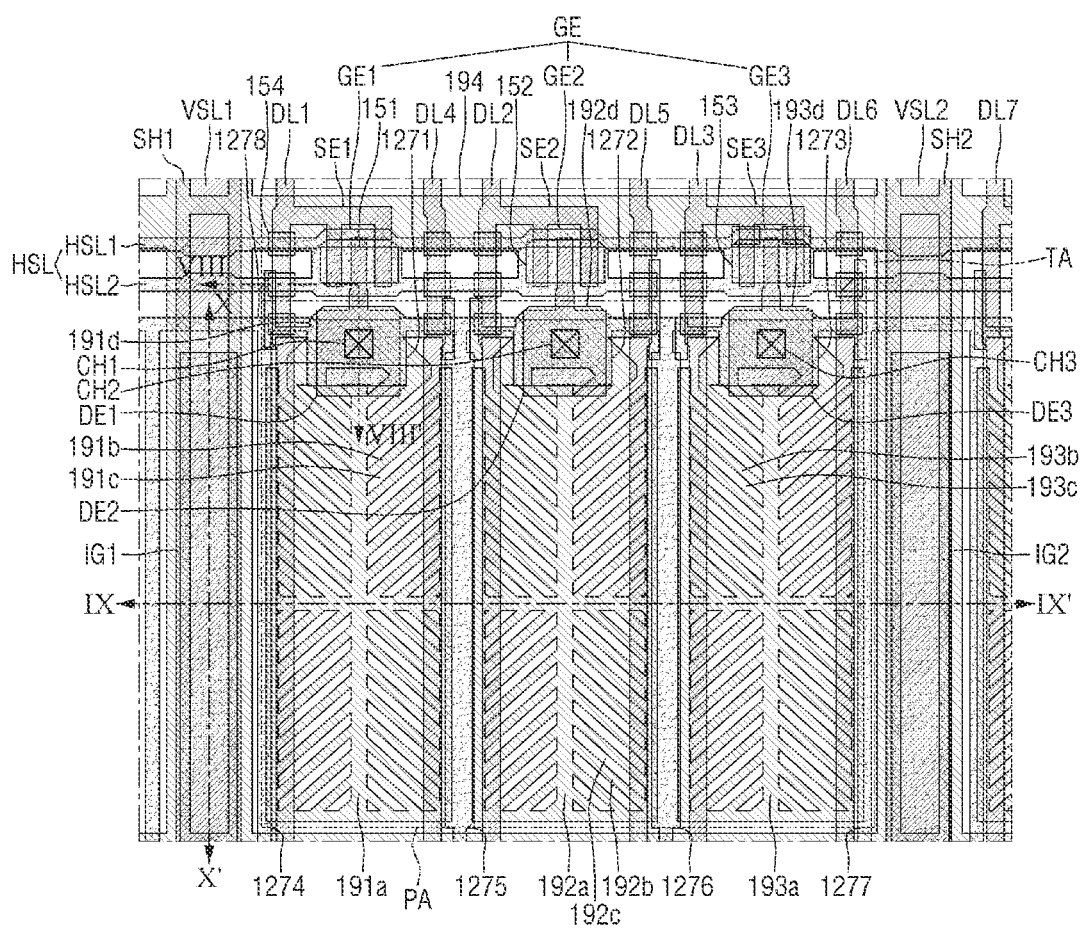
FIG. 4 is an enlarged layout view illustrating first, second, and third pixels.
Figure 5:
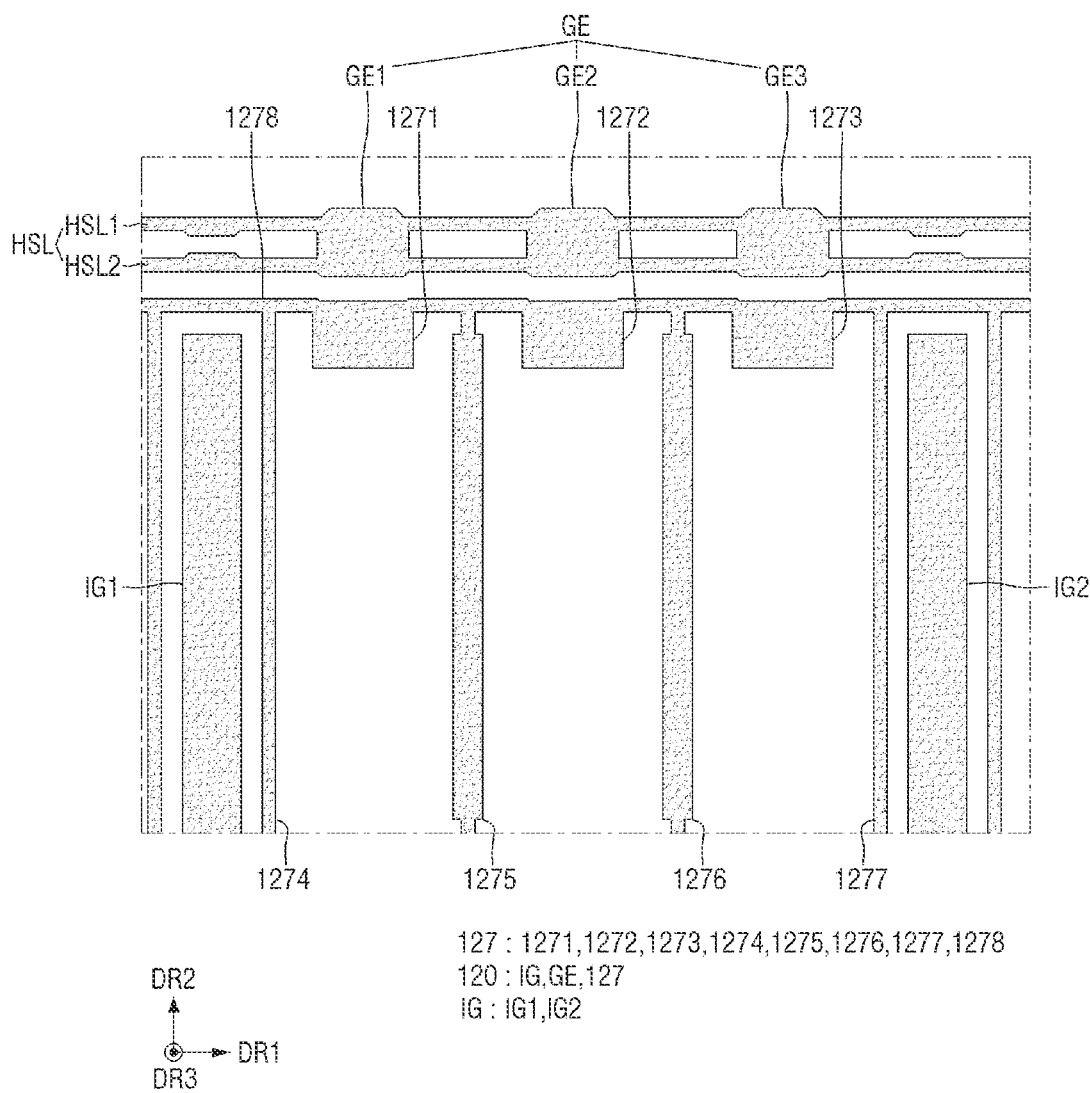
FIG. 5 is a layout view illustrating a gate conductive layer of FIG. 4.
Figure 7:
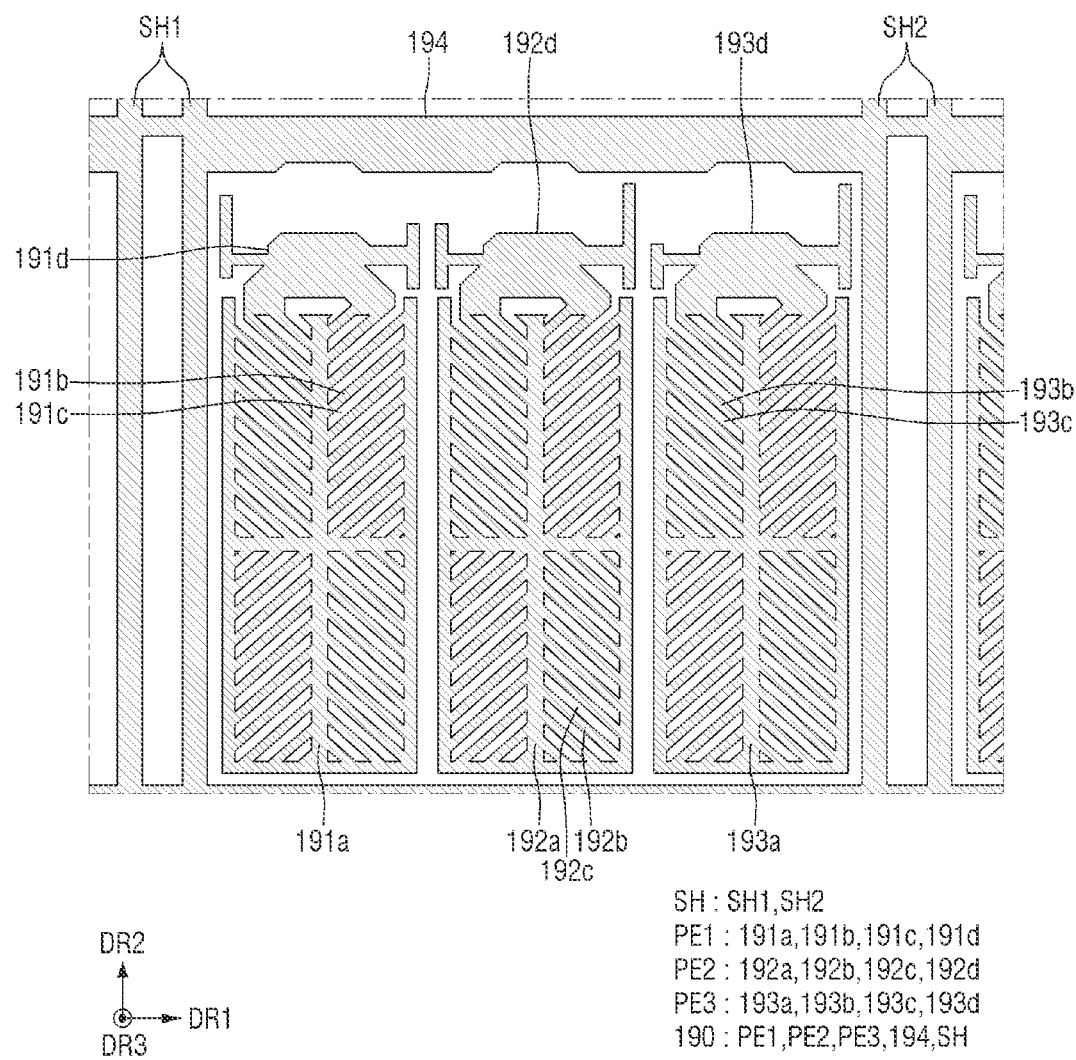
FIG. 7 is a layout view of a pixel electrode layer of FIG. 4.
Figure 8:
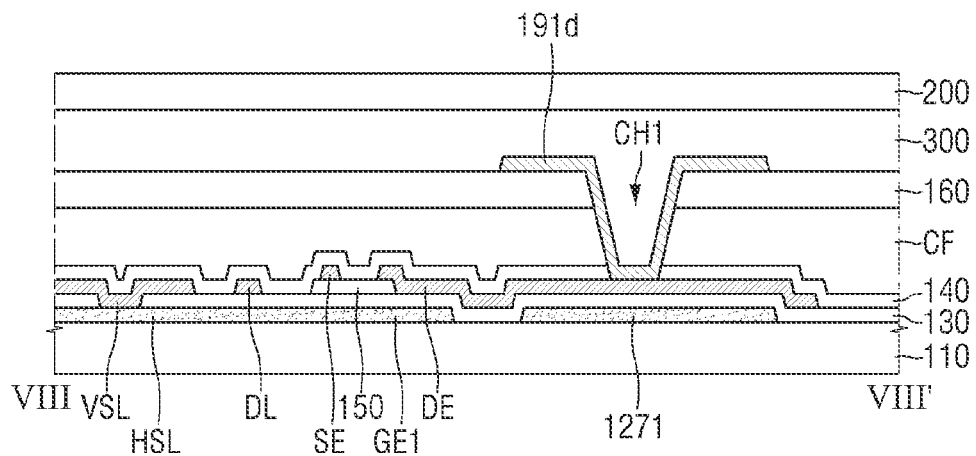
FIG. 8 is a cross-sectional view taken along line VIII-VIII' of FIG. 4.
Figure 9:
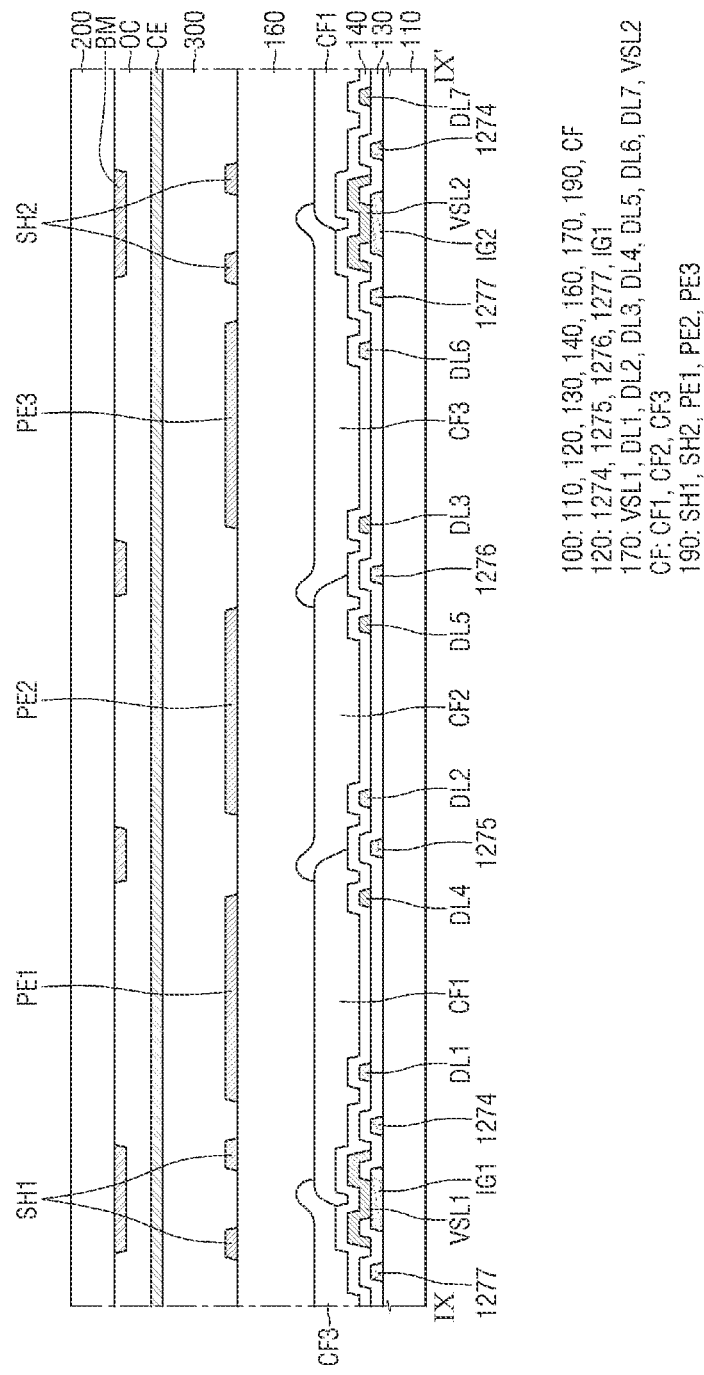
FIG. 9 is a cross-sectional view taken along line IX-IX' of FIG. 4.
Figure 10:
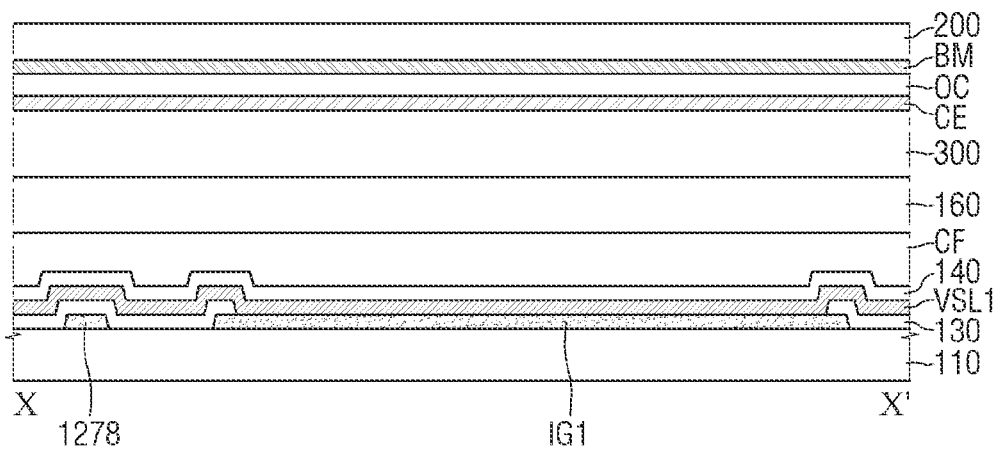
FIG. 10 is a cross-sectional view taken along line X-X' of FIG. 4.
Figure 11:
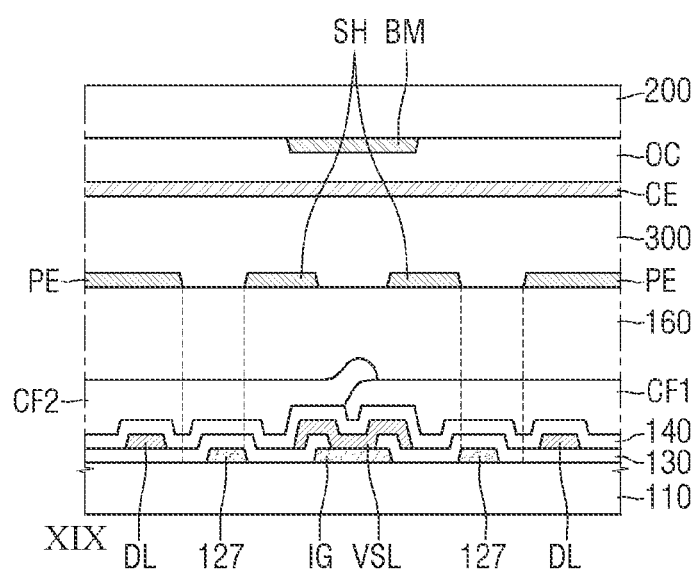
FIG. 11 is a cross-sectional view illustrating the structuring of shield electrodes in the display device of FIG. 1.

FIG. 4 is an enlarged layout view illustrating first, second, and third pixels. FIG. 5 is a layout view illustrating a gate conductive layer of FIG. 4. FIG. 6 is a layout view illustrating a data conductive layer of FIG. 4. FIG. 7 is a layout view of a pixel electrode layer of FIG. 4. FIG. 8 is a cross-sectional view taken along line VIII-VIII' of FIG. 4. FIG. 9 is a cross-sectional view taken along line IX-IX' of FIG. 4. FIG. 10 is a cross-sectional view taken along line X-X' of FIG. 4. FIG. 11 is a cross-sectional view illustrating the structuring of shield electrodes in the display device of FIG. 1.

Referring to FIGS. 4 through 11, the display device 1 may include a first substrate 100, a second substrate 200, and a liquid crystal layer 300. The second substrate 200 may face the first substrate 100, and the liquid crystal layer 300 may be disposed between the first and second substrates 100 and 200.

The first substrate 100 may be a TFT array substrate with switching elements disposed on the first substrate 100. The second substrate 200 may be a counterpart substrate opposite to the first substrate 100.

The first substrate 100 may include a first base substrate 110, a gate conductive layer 120, a gate insulating layer 130, a passivation layer 140, a semiconductor layer 150, a data conductive layer 170, a planarization layer 160, and a pixel electrode layer 190. The first substrate 100 may further include color filters CF.

The first base substrate 110 may be formed of an insulating material such as glass, quartz, or a polymer resin. The polymer resin may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof. The first base substrate 110 may also include a metallic material.

Pixel areas PA and switching element areas TA may be defined on the first base substrate 110. The pixel areas PA may be defined as regions where pixel electrodes PE are disposed, and the switching element areas TA may be defined as regions where switching elements TR are disposed. The switching element areas TA may be disposed between the pixel areas TA in the second direction DR2.

The gate conductive layer 120 is disposed on the first base substrate 110. The gate conductive layer 120 may include the horizontal scan lines HSL and the gate electrodes GE. Here, the expression "a conductive layer including particular structures", as used herein, means that the particular structures are disposed in the same layer and are formed of the same material. Particular structures that are formed of a single conductive layer may be formed at the same time via patterning through a single mask process.

The horizontal scan lines HSL may extend in the first direction DR1. The horizontal scan lines HSL may be disposed between the pixel rows PXR. The gate electrodes GE may be connected to the horizontal scan lines HSL. For example, the gate electrodes GE may be disposed in the pixels PX and may be connected to one another by the horizontal scan lines HSL. Each of the pixels PX may include one gate electrode GE.

The horizontal scan lines HSL may include first and second horizontal scan lines HSL1 and HSL2. The first and second horizontal scan lines HSL1 and HSL2 may extend in the first direction DR1. The first horizontal scan line HSL1 may be disposed on a first side, i.e., the upper side, in the second direction DR2, of the gap between a pixel row PXR including first, second, and third pixels PX1, PX2, and PX3 and a pixel row PXR directly above the pixel row PXR including first, second, and third pixels PX1, PX2, and PX3. The second horizontal scan line HSL2 may be disposed on a second side, i.e., the lower side, in the second direction DR2, of the gap between the pixel row PXR including first, second, and third pixels PX1, PX2, and PX3 and the pixel row PXR directly above the pixel row PXR including first, second, and third pixels PX1, PX2, and PX3. The first horizontal scan line HSL1 may be connected to first ends, in the second direction DR2, of the gate electrode GE, and the second horizontal scan line HSL2 may be connected to second ends, in the second direction DR2, of the gate electrodes GE. Holes may be interposed between the first and second horizontal scan lines HSL1 and HSL2. The boundaries of each of the holes may be defined by the first horizontal scan line HSL1, the second horizontal scan line HSL2, and the gate electrodes GE.

The gate conductive layer 120 may further include a sustain lines 127. A sustain voltage may be applied to the sustain line 127. The sustain voltage may be substantially the same as the common voltage Vcom, which is applied to a common electrode CE, and may be a direct current (DC) voltage.

The sustain line 127 may include a central line portion 127S, which extends in the first direction DR1, extended portions 1274, 1275, 1276, and 1277, which are disposed on both sides, in the first direction DR1, of each of the pixels PX, and protruding portions 1271, 1272, and 1273, which protrude from the central line portion 1278 to the pixel electrodes PE.

The extended portions 1274, 1275, 1276, and 1277 of the sustain line 127 may include outer extended portions 1274 and 1277, which are disposed on a second side, in the first direction DR1 of the first pixel PX1 and on a first side, in the first direction DR1, of the third pixel PX3, respectively, and inner extended portions 1275 and 1276, which are disposed between the first pixel PX1 and the second pixel PX2 and between the second pixel PX2 and the third pixel PX3, respectively.

First ends, in the second direction DR2, of the extended portions 1274, 1275, 1276, and 1277 of the sustain line 127 may be connected to the central line portion 1278 of the sustain line 127, but second ends, in the second direction DR2, of the extended portions 1274, 1275, 1276, and 1277 of the sustain line 127 may not be connected to other elements.

The outer extended portions 1274 and 1277 of the sustain line 127 may generally have a uniform width, but the inner extended portions 1275 and 1276 of the sustain line 127 may have different widths from one region to another region. For example, the inner extended portions 1275 and 1276 may have a relatively small width at the first ends and the second ends of the inner extended portions 1275 and 1276 and may have a relatively large width between the first ends and the second ends of the inner extended portions 1275 and 1276. The width of the inner extended portions 1275 and 1276 at the first ends and the second ends of the inner extended portions 1275 and 1276 may be substantially the same as the width of the outer extended portions 1274 and 1277. The outer extended portions 1274 and 1277 may have a relatively smaller width than the inner extended portions 1275 and 1276 to improve transmittance. The extended portions 1274, 1275, 1276, and 1277 of the sustain line 127 may serve as light-shielding patterns for blocking the transmission of light at first and second sides, in the first direction DR1, of the pixel electrodes PE.

The outer extended portions 1274 and 1277 of the sustain line 127 may not overlap with the pixel electrode PE in a thickness direction. For example, the outer extended portions 1274 and 1277 of the sustain line 127 may not overlap with first, second, and third pixel electrodes PE1, PE2, and PE3 in the thickness direction. The outer extended portions 1274 and 1277 of the sustain line 127 may be disposed to be spaced apart from the first and second sub-horizontal scan lines HSL1 and HSL2, and may not overlap with first and second vertical scan lines VSL1 and VSL2.

The first, second, and third protruding portions 1271, 1272, and 1273 of the sustain line 127 may overlap with the first, second, and third pixels PX1, PX2, and PX3, respectively, in the thickness direction. The first protruding portion 1271 may overlap with a first drain electrode DE1 in the thickness direction to form sustain capacitance. The second protruding portion 1272 may overlap with a second drain electrode DE2 in the thickness direction to form sustain capacitance. The third protruding portion 1273 may overlap with a third drain electrode DE3 in the thickness direction to form sustain capacitance. The first, second, and third protruding portions 1271, 1272, and 1273 of the sustain line 127 may substantially have the same area as the first, second, and third drain electrodes DE1, DE2, and DE3.

The gate conductive layer 120 may further include island-type electrodes IG. The island-type electrodes IG may have a rectangular shape in a plan view, but the shape of the island-type electrodes IG is not particularly limited. The island-type electrodes IG may be disposed to overlap with the vertical scan lines VSL in the thickness direction. The width of the vertical scan lines VSL may be greater than the width of the island-type electrodes IG. In regions where the island-type electrodes IG and the vertical scan lines VSL overlap, the vertical scan lines VSL may protrude outwardly beyond the island-type electrodes IG.

The island-type electrodes IG may be connected to the vertical scan lines VSL in the regions where the island-type electrodes IG and the vertical scan lines VSL overlap in the thickness direction. Here, the expression "connection", as used herein, not only means physical connection, but also encompasses electrical connection. The island-type electrodes IG may be in direct contact with, and connected to, the vertical scan lines VSL. For example, the island-type electrodes IG may be electrically connected to the vertical scan lines VSL, which overlap with the island-type electrodes IG, via contact holes. In this example, the island-type electrodes IG and the vertical scan lines VSL may form a double-wire structure in the regions where the island-type electrodes IG and the vertical scan lines VSL overlap in the thickness direction and are connected. Due to the double-wire structure, the attenuation and/or the delay of the gate signal Sn, which is applied to the vertical scan lines VSL, can be minimized.

The island-type electrodes IG may be disposed to be spaced apart from the first sub-horizontal scan line HSL1, the second sub-horizontal scan line HSL2, and the sustain line 127.

The gate conductive layer 120 may include at least one metal selected from among molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W), and copper (Cu). The gate conductive layer 120 may be a single-layer structure or a multilayer structure consisting of multiple films of different materials.

The gate insulating layer 130 may be disposed on the gate conductive layer 120. The gate insulating layer 130 may cover the gate conductive layer 120. The gate insulating layer 130 may be disposed on the entire surface of the first base substrate 110. The gate insulating layer 130 may include openings, which expose at least parts of the horizontal scan lines HSL. The horizontal scan lines HSL may be connected to the vertical scan lines VSL via the openings included in the gate insulating layer 130.

The gate insulating layer 130 may include an inorganic insulating material such as a silicon compound or a metal oxide. For example, the gate insulating layer 130 may include silicon oxide, silicon nitride, silicon oxynitride, aluminum oxide, tantalum oxide, hafnium oxide, zirconium oxide, titanium oxide, or a combination thereof. The gate insulating layer 130 may be a single-layer film or a multilayer film consisting of multiple films of different materials.

The semiconductor layer 150 may be disposed on the gate insulating layer 130. The semiconductor layer 150 may include semiconductor patterns 151, 152, and 153, which are formed as islands. Specifically, the semiconductor layer 150 may include first, second, and third semiconductor patterns 151, 152, and 153. The first semiconductor pattern 151 may form the channel of a TFT that provides a first data signal D1 to the first pixel electrode PEL. The second semiconductor pattern 152 may form the channel of a TFT that provides a second data signal D2 to the second pixel electrode PE2. The third semiconductor pattern 153 may form the channel of a TFT that provides a third data signal D3 to the third pixel electrode PE3.

The second semiconductor pattern 152 may be disposed to be spaced apart in the first direction DR1 from the first semiconductor pattern 151, and the third semiconductor pattern 152 may be disposed to be spaced apart in the first direction DR1 from the second semiconductor pattern 152. The distance between the first and second semiconductor patterns 151 and 152 may be substantially the same as the distance between the second and third semiconductor patterns 152 and 153.

The first, second, and third semiconductor patterns 151, 152, and 153 may overlap with first, second, and third gate electrodes GE1, GE2, and GE3, respectively, in the thickness direction. The first, second, and third semiconductor patterns 151, 152, and 153 may be regions, sometimes called channel regions, where in response to an electric field being applied by the gate electrodes GE, the conductivity between source electrodes SE and the drain electrodes DE is inverted so that channels are formed. For example, if an electric field is applied to the first semiconductor pattern 151 by the first gate electrode GE1, the conductivity between a first source electrode SE1 and the first drain electrode DE1 may be inverted so that a channel may be formed. If an electric field is applied to the second semiconductor pattern 152 by the second gate electrode GE2, the conductivity between a second source electrode SE2 and the second drain electrode DE2 may be inverted so that a channel may be formed. If an electric field is applied to the third semiconductor pattern 153 by the third gate electrode GE3, the conductivity between a third source electrode SE3 and the third drain electrode DE3 may be inverted so that a channel may be formed.

The semiconductor layer 150 may further include supporting semiconductor patterns 154. The supporting semiconductor patterns 154 may be disposed between the gate insulating layer 130 and the data conductive layer 170. The supporting semiconductor patterns 154 may support the first, second, third, fourth, fifth, and sixth data lines DL1, DL2, DL3, DL4, DL5, and DL6 and the first, second, and third source electrodes SE1, SE2, and SE3.

The supporting semiconductor patterns 154 may be disposed in regions where the first sub-horizontal scan line HSL1 and the first, second, third, fourth, fifth, and sixth data lines DL1, DL2, DL3, DL4, DL5, and DL6 overlap, regions where the second sub-horizontal scan line HSL2 and the first, second, third, fourth, fifth, and sixth data lines DL1, DL2, DL3, DL4, DL5, and DL6 overlap, and regions where the central line portion 1278 of the sustain line 127 and the first, second, third, fourth, fifth, and sixth data lines DL1, DL2, DL3, DL4, DL5, and DL6 overlap. The supporting semiconductor patterns 154 may also be disposed in regions where the first, second, and third gate electrodes GE1, GE2, and GE3 and the first, second, and third source electrodes SE1, SE2, and SE3 overlap. The supporting semiconductor patterns 154 may also be disposed in regions where the central line portion 1278 of the sustain line 127 and the vertical scan lines VSL overlap. However, the supporting semiconductor patterns 154 may also be disposed in other regions than those set forth herein, between the gate insulating layer 130 and the data conductive layer 170.

The supporting semiconductor patterns 154 may entirely cover the above-mentioned overlapping regions. Thus, even if the alignment between the semiconductor layer 150 and the data conductive layer 170 changes, the supporting semiconductor patterns 154 can properly support the first, second, third, fourth, fifth, and sixth data lines DL1, DL2, DL3, DL4, DL5, and DL6 and the vertical scan lines VSL.

As the size of the display device 1 increases, the lengths of the data lines DL, the vertical scan lines VSL, and/or the horizontal scan lines HSL may also increase. Accordingly, the resistance of the data lines DL increases, and as a result, the attenuation and/or the delay of the data signal Dm may occur. In order to lower the resistance of the data lines DL, the data lines DL may be formed to be sufficiently thick. In this case, since the supporting semiconductor patterns 154 supports the data lines DL, defects such as interferences and short circuits that are likely to occur as the thickness of the data lines DL increases can be alleviated or prevented.

The semiconductor layer 150 may include a silicon-based semiconductor material such as amorphous silicon, polycrystalline silicon, or monocrystalline silicon. Alternatively, the semiconductor layer 150 may include monocrystalline silicon, low-temperature polycrystalline silicon, or amorphous silicon. Yet alternatively, the semiconductor layer 150 may include an oxide semiconductor. For example, the semiconductor layer 150 may include a binary compound (ABx), a tertiary compound (ABxCy), or a quaternary compound (ABxCyDz) containing indium (In), zinc (Zn), gallium (Ga), tin (Sn), titanium (Ti), aluminum (Al), hafnium (Hf), zirconium (Zr), or magnesium (Mg). The semiconductor layer 150 may also include indium tin zinc oxide (ITZO) or indium gallium zinc oxide (IGZO).

The data conductive layer 170 may be disposed on the gate insulating layer 130 and the semiconductor layer 150. The data conductive layer 170 may be formed using a different mask from the semiconductor layer 150. Thus, part of the data conductive layer 170 may be in contact with the sides of at least one of the elements of the semiconductor layer 150, for example, the sides of the first semiconductor pattern 151. In each of the first, second, and third pixels PX1, PX2, and PX3, the area occupied by the data conductive layer 170 may be greater than the area occupied by the semiconductor layer 150.

The data conductive layer 170 may include the first, second, third, fourth, fifth, and sixth data lines DL1, DL2, DL3, DL4, DL5, and DL6, the first, second, and third source electrodes SE1, SE2, and SE3, the first, second, and third drain electrodes DE1, DE2, and DE3, and the vertical scan lines VSL.

The first, second, third, fourth, fifth, and sixth data lines DL1, DL2, DL3, DL4, DL5, and DL6 may generally extend in the second direction DR2. The first and fourth data lines DL1 and DL4 may partially overlap with the first pixel electrode PE1. The second and fifth data lines DL2 and DL5 may partially overlap with the second pixel electrode PE2. The third and sixth data lines DL3 and DL6 may partially overlap with the third pixel electrode PE3.

The source electrodes SE may include the first source electrode SE1, which is connected to the first data line DL1, the second source electrode SE2, which is connected to the second data line DL2, and the third source electrode SE3, which is connected to the third data line DL3. The first source electrode SE1 may be disposed on the first semiconductor pattern 151. The second source electrode SE2 may be disposed on the second semiconductor pattern 152. The third source electrode SE3 may be disposed on the third semiconductor pattern 153. Each of the source electrodes SE may include a horizontal extended portion, which extends in the first direction DR1 from one of the data lines DL, and a pair of vertical extended portions, which extend in the second direction DR2 from a first end, in the first direction DR1, of the horizontal extended portion and from the middle of the horizontal extended portion. The horizontal extended portion and the vertical extended portions of each of the source electrodes SE may have the same width. Specifically, regions where the first, second, and third source electrodes SE1, SE2, and SE3 overlap with the first, second, and third semiconductor patterns 151, 152, and 153, respectively, may be parts of the pairs of vertical portions of the first, second, and third source electrodes SE1, SE2, and SE3.

The drain electrodes DE may include the first drain electrode DE1, which is connected to the first pixel electrode PE1, the second drain electrode DE2, which is connected to the second pixel electrode PE2, and the third drain electrode DE3, which is connected to the third pixel electrode PE3.

The drain electrodes DE may be disposed to be spaced apart from, and face, the source electrodes SE over the semiconductor patterns 151, 152, and 153. For example, the first drain electrode DE1 may be disposed to be spaced apart from, and face, the first source electrode SE1 over the first semiconductor pattern 151. The second drain electrode DE2 may be disposed to be spaced apart from, and face, the second source electrode SE2 over the second semiconductor pattern 152. The third drain electrode DE3 may be disposed to be spaced apart from, and face, the third source electrode SE3 over the third semiconductor pattern 153.

The first drain electrode DE1 may include a first rod-shaped portion DE1a, which partially overlaps with the first source electrode SE1 in the first direction DR1 and extends along the second direction DR2, a first extended portion DE1b, which partially overlaps with the first pixel electrode PE1, and a first connecting portion DE1c, which is disposed between the first rod-shaped portion DE1a and the first extended portion DE1b. The second drain electrode DE2 may include a second rod-shaped portion DE2a, which partially overlaps with the second source electrode SE2 in the first direction DR1 and extends along the second direction DR2, a second extended portion DE2b, which partially overlaps with the second pixel electrode PE2, and a second connecting portion DE2c, which is disposed between the second rod-shaped portion DE2a and the second extended portion DE2b. The third drain electrode DE3 may include a third rod-shaped portion DE3a, which partially overlaps with the third source electrode SE3 in the first direction DR1 and extends along the second direction DR2, a third extended portion DE3b, which partially overlaps with the third pixel electrode PE3, and a third connecting portion DE3c, which is disposed between the third rod-shaped portion DE3a and the third extended portion DE3b. Parts of the first, second, and third rod-shaped portions DE1a, DE2a, and DE3a may be disposed on the first, second, and third semiconductor patterns 151, 152, and 153, respectively. The first, second, and third connecting portions DE1c, DE2c, and DE3c may have a larger width than the first, second, and third rod-shaped portions DE1a, DE2a, and DE3a.

The first, second, and third extended portions DE1b, DE2b, and DE3b may have a rectangular shape in a plan view. The first, second, and third extended portions DE1b, DE2b, and DE3b may have substantially the same area as the first, second, and third gate electrodes GE1, GE2, and GE3. The first, second, and third extended portions DE1b, DE2b, and DE3b may be shorter in the first direction DR1 than the first, second, and third gate electrodes GE1, GE2, and GE3, but may be longer in the second direction DR2 than the first, second, and third gate electrodes GE1, GE2, and GE3. Parts of the first, second, and third extended portions DE1b, DE2b, and DE3b may overlap with parts of the first, second, and third gate electrodes GE1, GE2, and GE3. Although not specifically illustrated, ohmic contact layers may be further interposed between the semiconductor patterns 151, 152, and 153 and the source electrodes SE/the drain electrodes DE.

The data conductive layer 170 may include the vertical scan lines VSL. The vertical scan lines VSL may extend in the second direction DR2 and may be parallel to the pixel columns PXC. For example, one vertical scan line VSL may be disposed for every three pixel columns PXC. That is, three pixel columns PXC may be disposed between each pair of adjacent vertical scan lines VSL. For example, the vertical scan lines VSL may include the first vertical scan line VSL1, which is disposed on the second side, in the first direction DR1, of the first pixel column PXC1, and the second vertical scan line VSL2, which is disposed on the first side, in the first direction DR1, of the third pixel column PXC3.

As described above with reference to FIG. 3, the vertical scan lines VSL may extend in the second direction DR2 from the first integrated circuits GDIC of the integrated drivers DIC and may include the gate channels GC, which are disposed in the middle, and the dummy lines DM, which are disposed on both the first and second sides, in the first direction DR1, of the array of the gate channels GC. The scan signal Sn may be applied to the gate channels GC, and the gate-off voltage Voff or the common voltage Vcom, instead of the scan signal Sn, may be applied to the dummy lines DM.

The data conductive layer 170 may include at least one metal selected from among Al, Pt, Pd, Ag, Mg, Mo, Au, Ni, Nd, Ir, Cr, Ti, Ta, W, and Cu. The data conductive layer 170 may be a single- or multilayer film. For example, the data conductive layer 170 may be formed to have a stack structure of Ti/Al/Ti, Mo/Al/Mo, Mo/AlGe/Mo, or Ti/Cu.

The passivation layer 140 may be disposed on the data conductive layer 170. The passivation layer 140 may be disposed on the entire surface of the first base substrate 110. The passivation layer 140 may include openings that expose at least parts of the drain electrodes DE. The passivation layer 140 may be formed of, for example, an inorganic insulating material such as silicon nitride or silicon oxide. The passivation layer 140 may prevent the penetration of the pigments from the color filters CF into the semiconductor layer 150.

The color filters CF may be disposed on the passivation layer 130. The color filters CF may include a first color filter CF1, which overlaps with the first pixel PX1, a second color filter CF2, which overlaps with the second pixel PX2, and a third color filter CF3, which overlaps with the third pixel PX3. The color of each of the first, second, and third color filters CF1, CF2, and CF3 may be one of red, green, and blue. The color filters CF may partially overlap with one another at the boundaries between the color filters CF. The color filters CF may overlap with the pixel electrodes PE. The color filter CF may also be disposed in the regions where the switching elements TR are disposed and may thus overlap with the switching elements TR.

The planarization layer 160 may be disposed on the color filters CF. The planarization layer 160 may have excellent planarization characteristics and may include an organic material with photosensitivity. The planarization layer 160 may fill any height differences generated by the underlying structure, for example, the color filters CF, and may planarize the surface on which the pixel electrodes PE are to be disposed. However, the planarization layer 160 or the color filters CF may not be provided.

Contact holes CH1, CH2, and CH3, which expose parts of the drain electrodes DE, may be disposed on the passivation layer 140, the color filters, and the planarization layer 160. The contact holes CH1, CH2, and CH3 may include a first contact hole CH1, which is disposed in the first pixel PX1, a second contact hole CH2, which is disposed in the second pixel PX2, and a third contact hole CH3, which is disposed in the third pixel PX3.

The extended portion DE1b of the first drain electrode DE1 may be exposed by the first contact hole CH1, the extended portion DE2b of the second drain electrode DE2 may be exposed by the second contact hole CH2, and the extended portion DE3b of the third drain electrode DE3 may be exposed by the third contact hole CH3.

The pixel electrode layer 190 may be disposed on the planarization layer 160. The pixel electrode layer 190 may include the first, second, and third pixel electrodes PE1, PE2, and PE3.

The first pixel electrode PE1 may be electrically connected to, and in contact with, the first drain electrode DE1 through the first contact hole CH1. The second pixel electrode PE2 may be electrically connected to, and in contact with, the second drain electrode DE2 through the second contact hole CH2. The third pixel electrode PE3 may be electrically connected to, and in contact with, the third drain electrode DE3 through the third contact hole CH3.

The first pixel electrode PE1 may include a stem portion 191a, branch portions 191b, which extend outwardly from the stem portion 191a and are spaced apart from one another by slits 191c, and a pixel extension portion 191d, which extends to a switching element area. The second pixel electrode PE2 may include a stem portion 192a, branch portions 192b, which extend outwardly from the stem portion 192a and are spaced apart from one another by slits 192c, and a pixel extension portion 192d, which extends to a switching element area. The third pixel electrode PE3 may include a stem portion 193a, branch portions 193b, which extend outwardly from the stem portion 193a and are spaced apart from one another by slits 193c, and a pixel extension portion 193d, which extends to a switching element area. The pixel electrode layer 190 may further include pixel outline portions 194, which are disposed on first and second sides, in the second direction DR2, of each of the first, second, and third pixel electrodes PE1, PE2, and PE3.

The stem portion 191a, 192a, or 193a may include a horizontal stem that generally extends in the first direction DR1 and a vertical stem that generally extends in the second direction DR2 and may divide the first, second, or third pixel electrode PE1, PE2, or PE3 into sub-regions, sometimes called domains. The stem portion 191a, 192a, or 193a may be provided in a cross shape. In this case, the first, second, or third pixel electrode PE1, PE2, and PE3 may be divided into four sub-regions, sometimes called four domains, by the stem portion 191a, 192a, or 193a. The direction in which the branch portions 191b, 192b, or 193b extend may vary from one sub-region, sometimes called domain, to another sub-region, sometimes called domain, of the first, second, or third pixel electrode PE1, PE2, or PE3. For example, referring to FIG. 7, the branch portions 191b, 192b, or 193b may extend diagonally from the stem portion 191a, 192a, or 193a in an upper right direction in an upper right sub-region of the first, second, or third pixel electrode PE1, PE2, or PE3, in a lower right direction in a lower right sub-region of the first, second, or third pixel electrode PE1, PE2, or PE3, in an upper left direction in an upper left sub-region of the first, second, or third pixel electrode PE1, PE2, or PE3, and in a lower left direction in a lower left sub-region of the first, second, or third pixel electrode PE1, PE2, or PE3.

The pixel extension portion 191d, 192d, or 193d may extend from the stem portion 191a, 192a, or 193a or from the branch portions 191b, 192b, or 193b to the switching element area and may thus be connected to the first, second, or third drain electrode DE1, DE2, or DE3 via the first, second, or third contact hole CH1, CH2, or CH3.

The first pixel electrode PE1 may overlap with the first and fourth data lines DL1 and DL4. Parts of the first and fourth data lines DL1 and DL4 that are disposed on the first pixel PX1 may completely overlap with the first pixel electrode PE1. The second pixel electrode PE2 may overlap with the second and fifth data lines DL2 and DL5. Parts of the second and fifth data lines DL2 and DL5 that are disposed on the second pixel PX2 may completely overlap with the second pixel electrode PE2. The third pixel electrode PE3 may overlap with the third and sixth data lines DL3 and DL6. Parts of the third and sixth data lines DL3 and DL6 that are disposed on the third pixel PX3 may completely overlap with the third pixel electrode PE3.

In the display device 1, parasitic capacitance Cgs may be generated between the pixel electrodes PE and the vertical scan lines VSL. The parasitic capacitance Cgs may change a kickback voltage Vkb of the pixels PX. The relationship between the parasitic capacitance Cgs and the kickback voltage Vkb may be represented by Equation (1):

$$Vkb = \frac{Cgs}{Cst + Clc + Cgs} \times (Von - Voff). \tag{1}$$

The kickback voltage Vkb of the pixels PX may generate differences in luminance between the pixels PX. Thus, the distribution of the kickback voltage Vkb of the pixels PX may cause an afterimage in a displayed image or may deteriorate visibility.

The pixel electrode layer 190 may further include shield electrodes SH. The shield electrodes SH may be disposed to be spaced apart from the pixel electrodes PE. The shield electrodes SH may not be electrically connected to the pixel electrodes PE. A shield voltage may be applied to the shield electrodes SH. The shield voltage may be substantially the same as the common voltage Vcom, which is applied to the common electrode CE, or may be a DC voltage.

The shield electrodes SH may include a first shield electrode SH1, which partially overlaps with the first vertical scan line VSL1, and a second shield electrode SH2, which partially overlaps with the second vertical scan line VSL2. Each of the shield electrodes SH1 and SH2 may include two sub-shield electrodes that are spaced apart from each other in the first direction DR1. For example, one sub-shield electrode of the first shield electrode SH1 may cover a first edge, in the first direction DR1, of the first vertical scan line VSL1, and the other sub-shield electrode of the first shield electrode SH1 may cover a second edge, in the first direction DR1, of the first vertical scan line VSL1. One sub-shield electrode of the second shield electrode SH2 may cover a first edge, in the first direction DR1, of the second vertical scan line VSL2, and the other sub-shield electrode of the second shield electrode SH2 may cover a second edge, in the first direction DR1, of the second vertical scan line VSL2.

The first shield electrode SH1 may be disposed on a second side, in the first direction DR1, of the first pixel PX1 and may extend in the second direction DR2. The second shield electrode SH2 may be disposed on a first side, in the first direction DR1, of the third pixel PX3 and may extend in the second direction DR2. Each of the shield electrodes SH1 and SH2 may include two sub-shield electrodes that extend in the second direction DR2 and are spaced apart from each other. A hole may be interposed between the two sub-shield electrodes of each of the shield electrodes SH1 and SH2.

The structuring of shield electrodes SH will hereinafter be described with reference to FIG. 11. Referring to FIG. 11, the shield electrodes SH may be disposed on the planarization layer 160 and may partially overlap with the island-type electrodes IG, the vertical scan lines VSL, and the sustain line 127 in the thickness direction. Specifically, the shield electrodes SH may partially overlap with the island-type electrodes IG and the vertical scan lines VSL on their first side in the first direction DR1 and may either partially overlap with the sustain line 127 or be aligned with one edge of the sustain line 127 on their second side in the first direction DR1. Alternatively, the shield electrodes SH may partially overlap with the island-type electrodes IG and the vertical scan lines VSL on their second side in the first direction DR1 and may either partially overlap with the sustain line 127 or be aligned with one edge of the sustain line 127 on their first side in the first direction DR1. The shield electrodes SH may partially overlap with the vertical scan lines VSL, thus providing a light leakage prevention function. Shielding capacitance Csh may be generated between the shield electrodes SH and the sustain line 127. Due to the shielding capacitance Csh, the parasitic capacitance Cgs, which is generated between the vertical scan lines VSL and the pixel electrodes PXE, can be minimized. Since a DC voltage is applied to both the shield electrodes SH and the sustain line 127, the shielding capacitance Csh can be uniform.

The shield electrodes SH may overlap with the common electrode CE and with part of a black matrix BM. The shield electrodes SH may not overlap with the data lines DL in the thickness direction.

The pixel electrode layer 190 may be formed of a transparent conductive material. For example, the pixel electrode layer 190 may include a transparent conductive oxide film of indium tin oxide (ITO), indium zinc oxide (IZO), or zinc oxide (ZO).

The second substrate 200 is disposed to face the first substrate 100. Although not specifically illustrated, the second substrate 200 may include a second base substrate, which is similar to the first base substrate 110, and may further include the black matrix BM, an overcoat layer OC, and the common electrode CE.

The liquid crystal layer 300 may be interposed between the first and second substrates 100 and 200. The liquid crystal layer 300 may include liquid crystal molecules having dielectric anisotropy. In a case where an electric field is applied between the first and second substrates 100 and 200, the liquid crystal molecules may rotate in a particular direction between the first and second substrates 100 and 200 and may thus adjust the phase delay of light transmitted through the liquid crystal layer 300. The amount of polarized light, i.e., light transmitted through a lower polarizing member, that passes through an upper polarizing member, e.g., disposed on a light exit side of the display device 1 and attached to the outer surface of, for example, the second substrate 200, varies depending on the degree to which the phase delay of light is changed by the rotation of the liquid crystal molecules, and as a result, the transmittance of the display device 1 can be controlled.

Since shield electrodes SH1a and SH2a to which a DC voltage that is substantially the same as the common voltage Vcom is applied are disposed in the pixel electrode layer 190, the shielding capacitance Csh can be generated between the shield electrodes SH1a and SH2a and the outer extended portions 1274 and 1277 of the sustain line 127, and as a result, the parasitic capacitance Cgs between the pixel electrodes PE and the vertical scan lines VSL can be minimized. Accordingly, the kickback voltage Vkb can be minimized. Therefore, a display device having first integrated circuits GDIC and second integrated circuits SDIC attached on one side of the display panel DP and thus having a small non-display area NDA can be provided.

Figure 12:
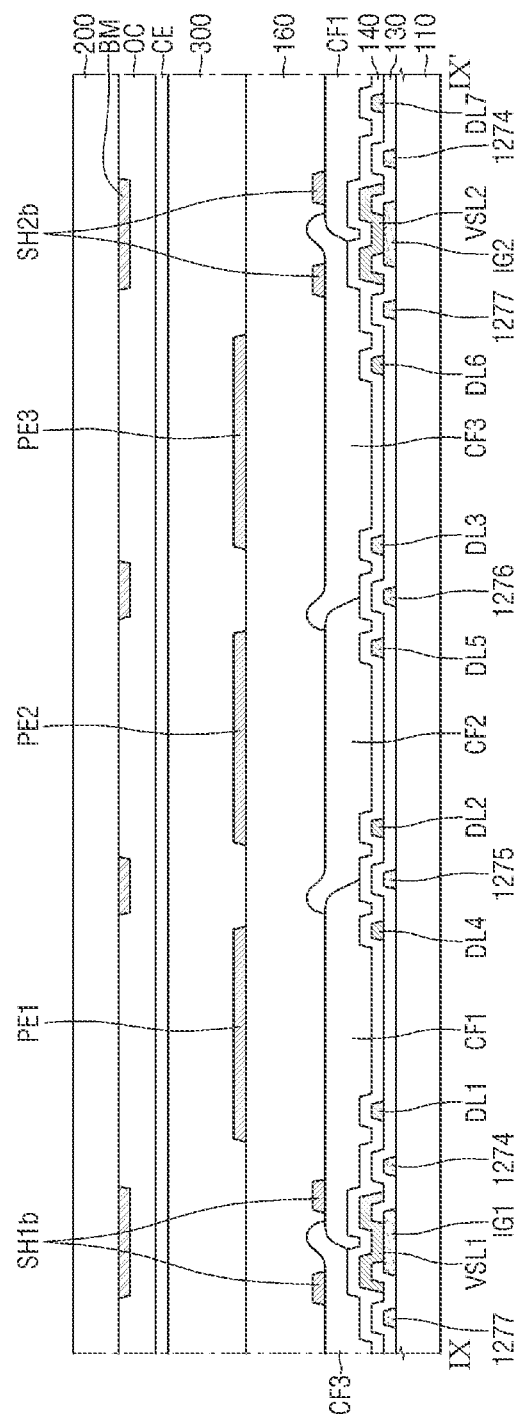
FIG. 12 is a cross-sectional view of a display device according to an embodiment of the present disclosure.
Figure 13:
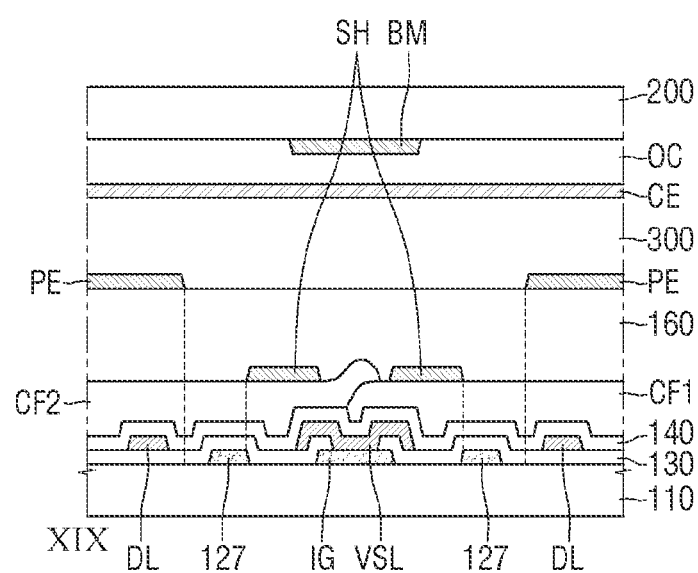
FIG. 13 is a cross-sectional view illustrating the structuring of shield electrodes in the display device of FIG. 12.

FIG. 12 is a cross-sectional view of a display device according to an embodiment of the present disclosure. FIG. 13 is a cross-sectional view illustrating the structuring of shield electrodes in the display device of FIG. 12.

Referring to FIGS. 12 and 13, a display device 1 differs from its counterpart of FIG. 4 through 10 in that shield electrodes SH1b and SH2b are not included in a pixel electrode layer 190, but are disposed on color filters CF. Specifically, the shield electrodes SH1b and SH2b may be disposed on the color filters CF, and a planarization layer 160 may be disposed on the shield electrodes SH1b and SH2b. The shield electrodes SH1b and SH2b may be disposed on flat parts of the color filters CF. Specifically, the shield electrodes SH1b and SH2b may be disposed on parts of the color filters CF that do not overlap with one another.

The shield electrodes SH1b and SH2b, like the pixel electrode layer 190, may be formed of a transparent conductive material. For example, the shield electrodes SH1b and SH2b may include a transparent conductive oxide film of ITO, IZO, or ZO.

The structuring of the shield electrodes SH1b and SH2b in first and second directions DR1 and DR2 may be the same as the structuring of the shield electrodes SH1 and SH2 or SH1a and SH2a of FIGS. 4 through 11, and thus, a detailed description of the structuring of the shield electrodes SH1b and SH2b will be omitted.

Since the shield electrodes SH1b and SH2b to which a DC voltage that is substantially the same as a common voltage Vcom is applied are disposed in the pixel electrode layer 190, shielding capacitance Csh can be generated between the shield electrodes SH1b and SH2b and outer extended portions 1274 and 1277 of a sustain line 127, and as a result, parasitic capacitance Cgs, which is generated between pixel electrodes PE and vertical scan lines VSL, can be minimized. Accordingly, a kickback voltage Vkb can be minimized. Therefore, a display device having first integrated circuits GDIC and second integrated circuits SDIC attached on one side of a display panel DP and thus having a small non-display area can be provided.

Figure 14:
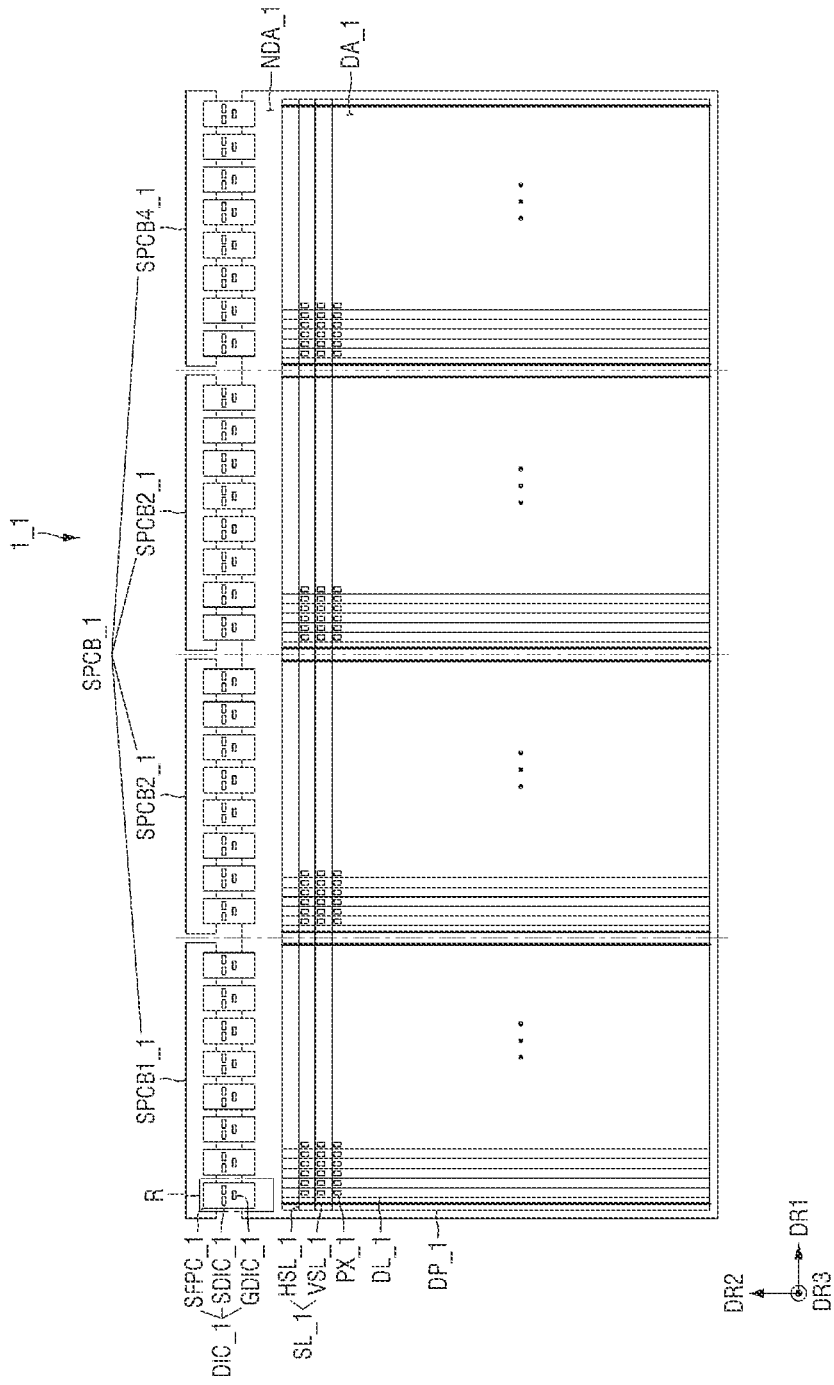
FIG. 14 is a plan view of a display device according to an embodiment of the present disclosure.
Figure 15:
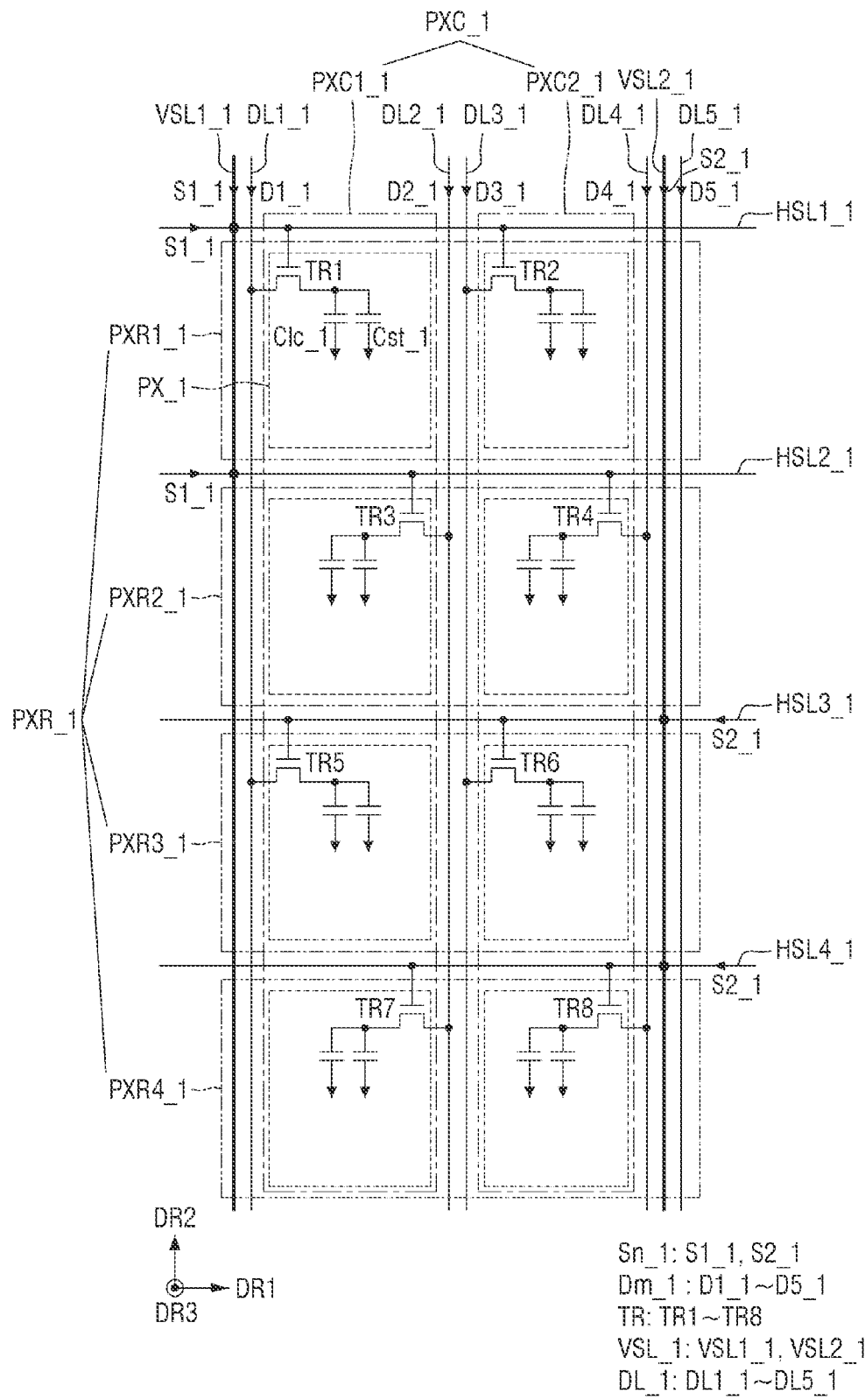
FIG. 15 is an equivalent circuit diagram of some pixels of FIG. 14.
Figure 16:
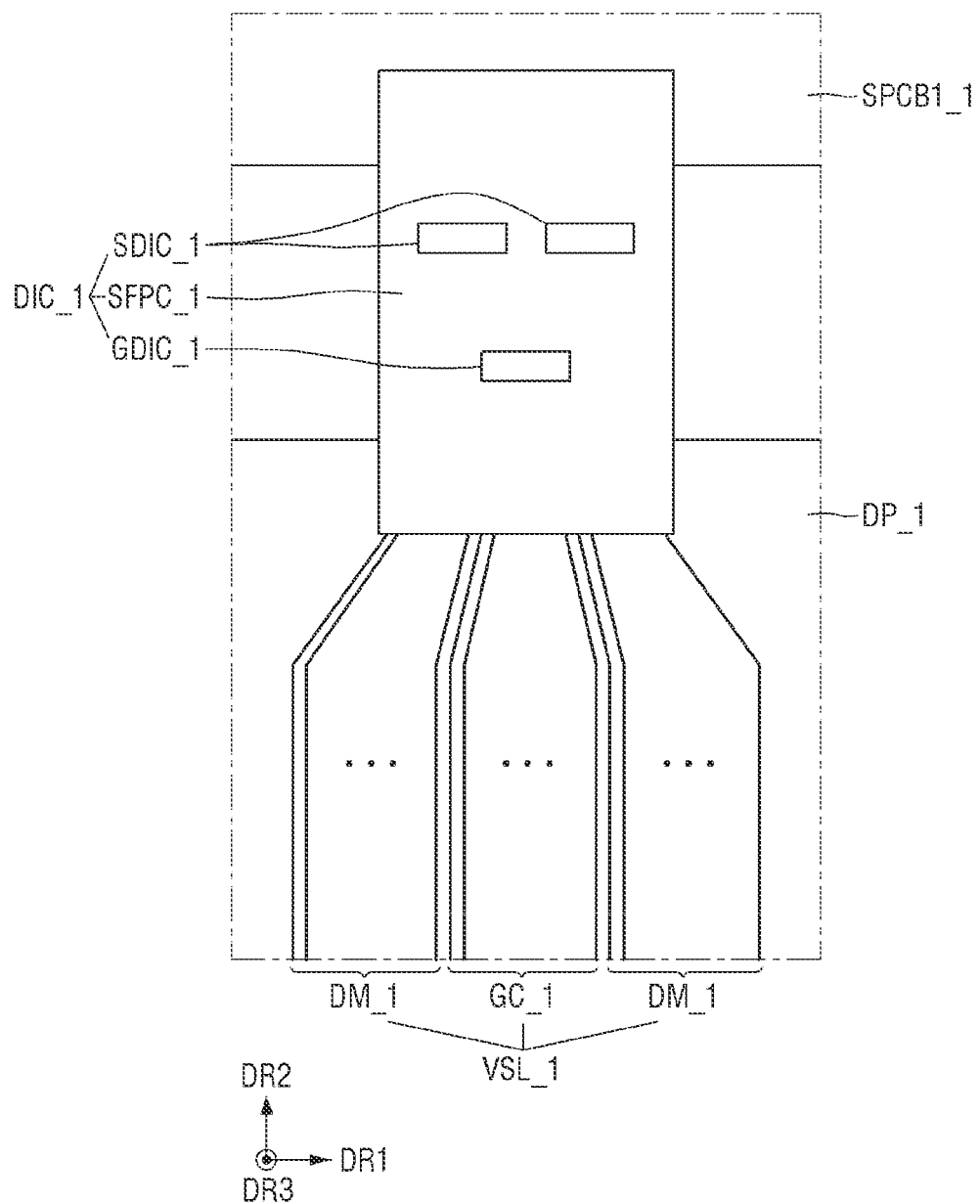
FIG. 16 is a plan view illustrating an area R of FIG. 14.
Figure 17:
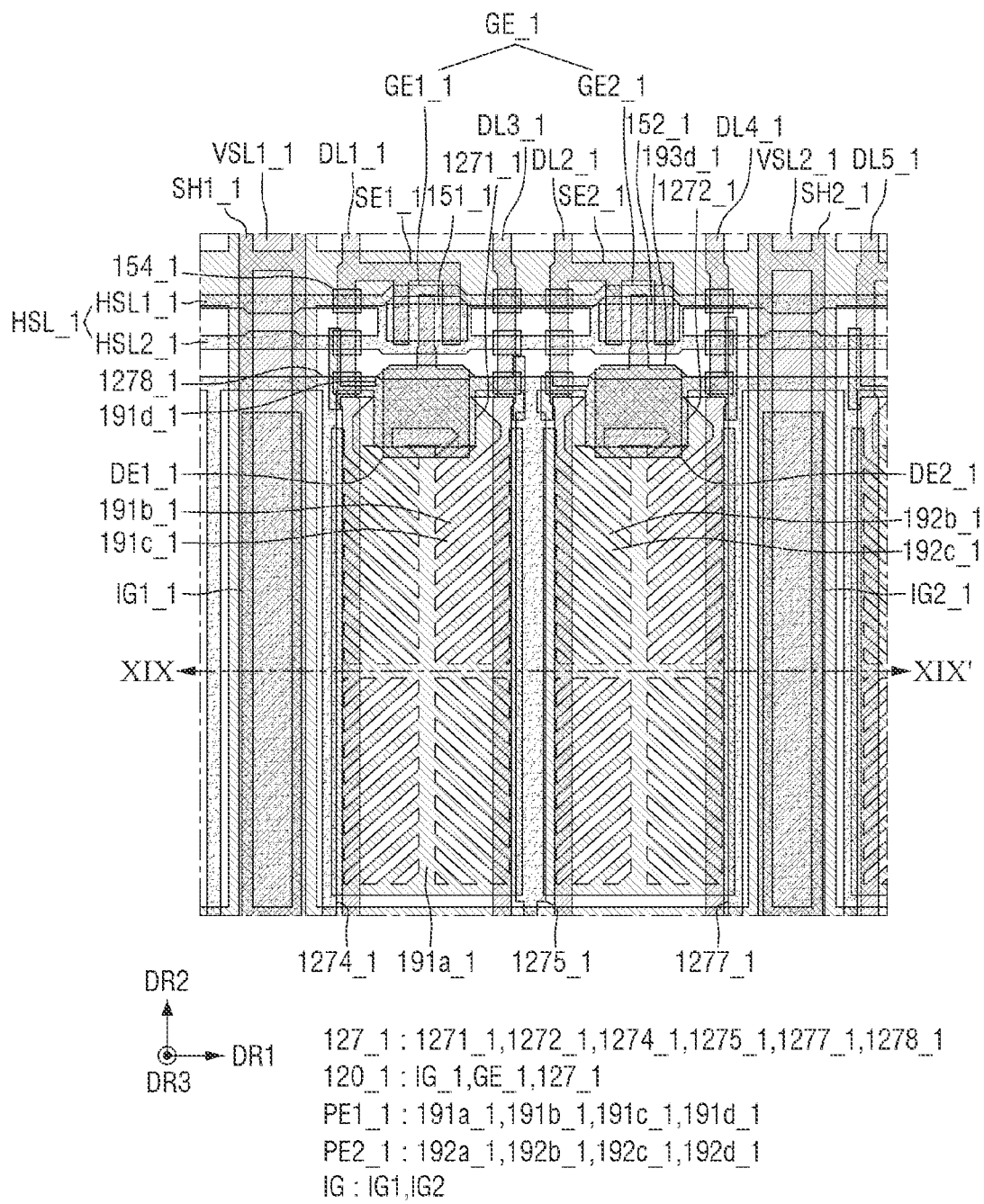
FIG. 17 is an enlarged layout view illustrating first and second pixels.
Figure 18:
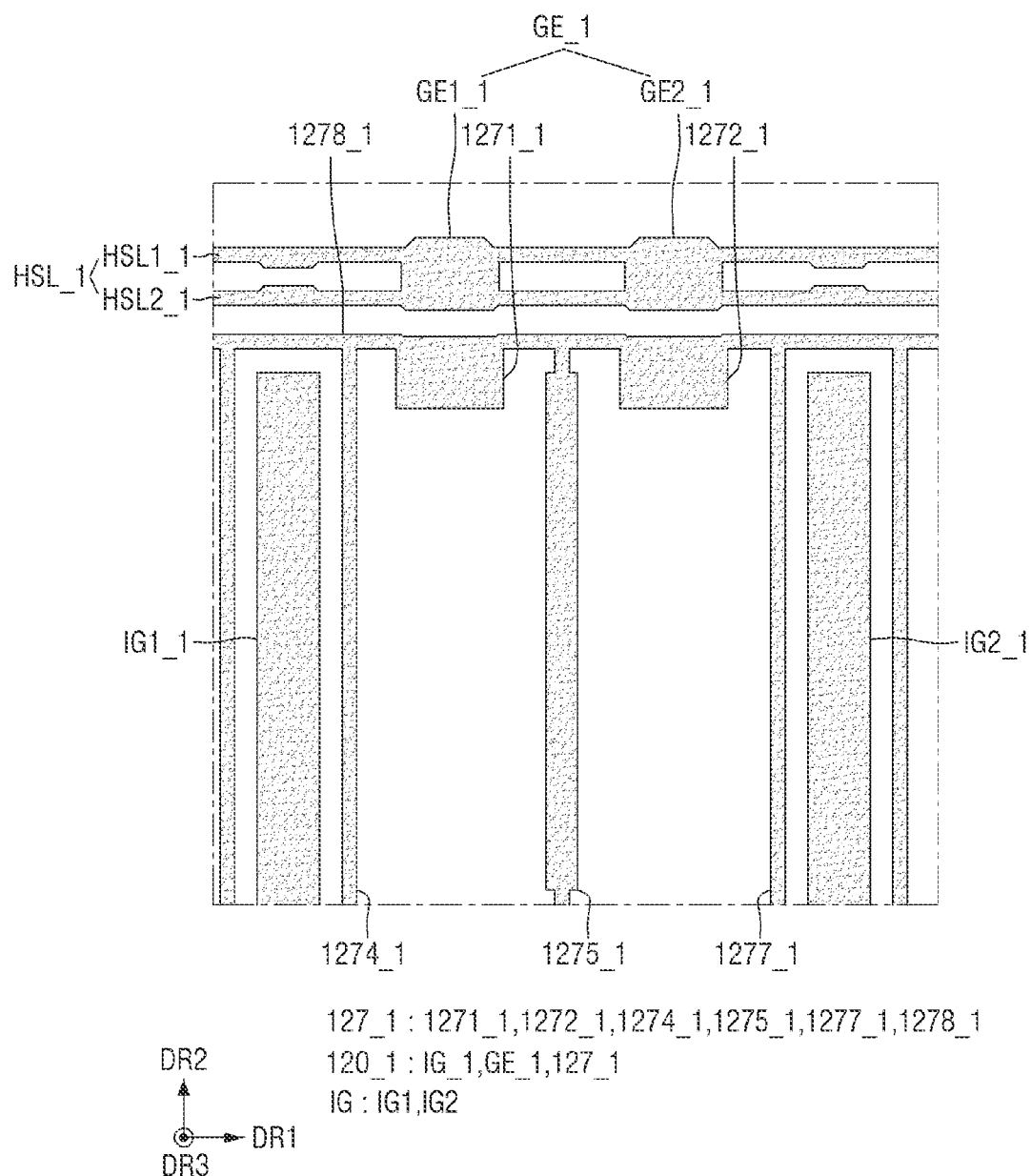
FIG. 18 is a layout view illustrating a gate conductive layer of FIG. 17.
Figure 19:
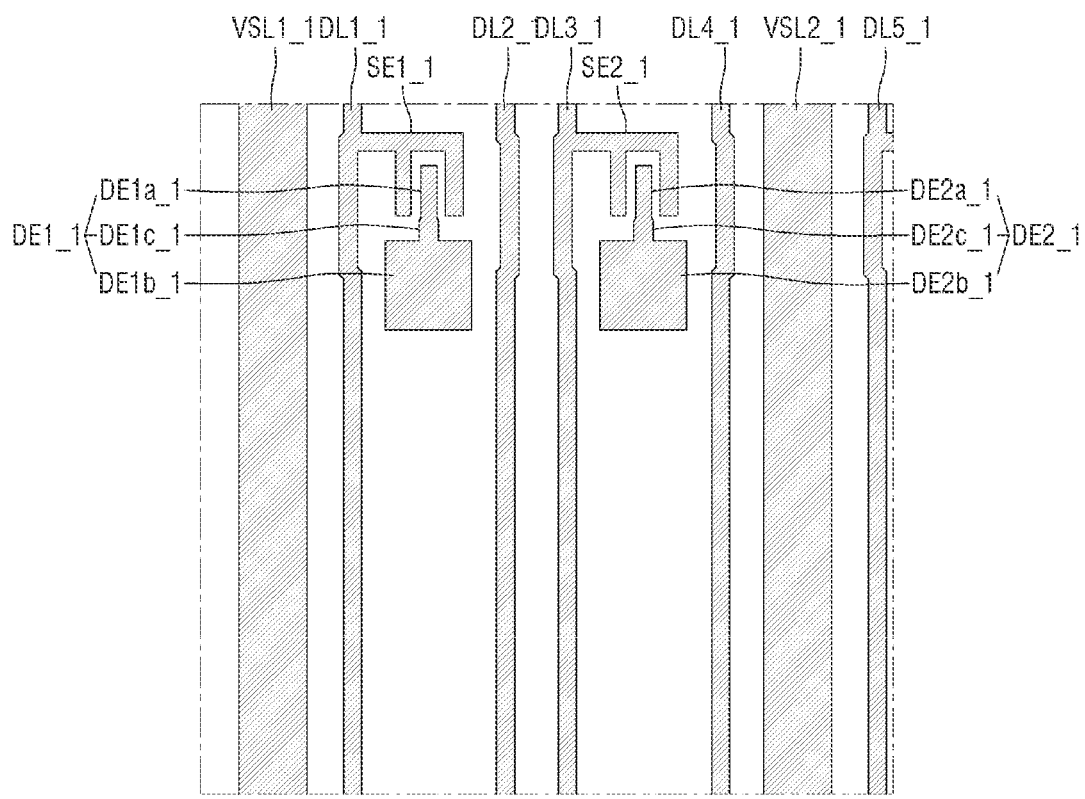
FIG. 19 is a layout view illustrating a data conductive layer of FIG. 17.
Figure 20:
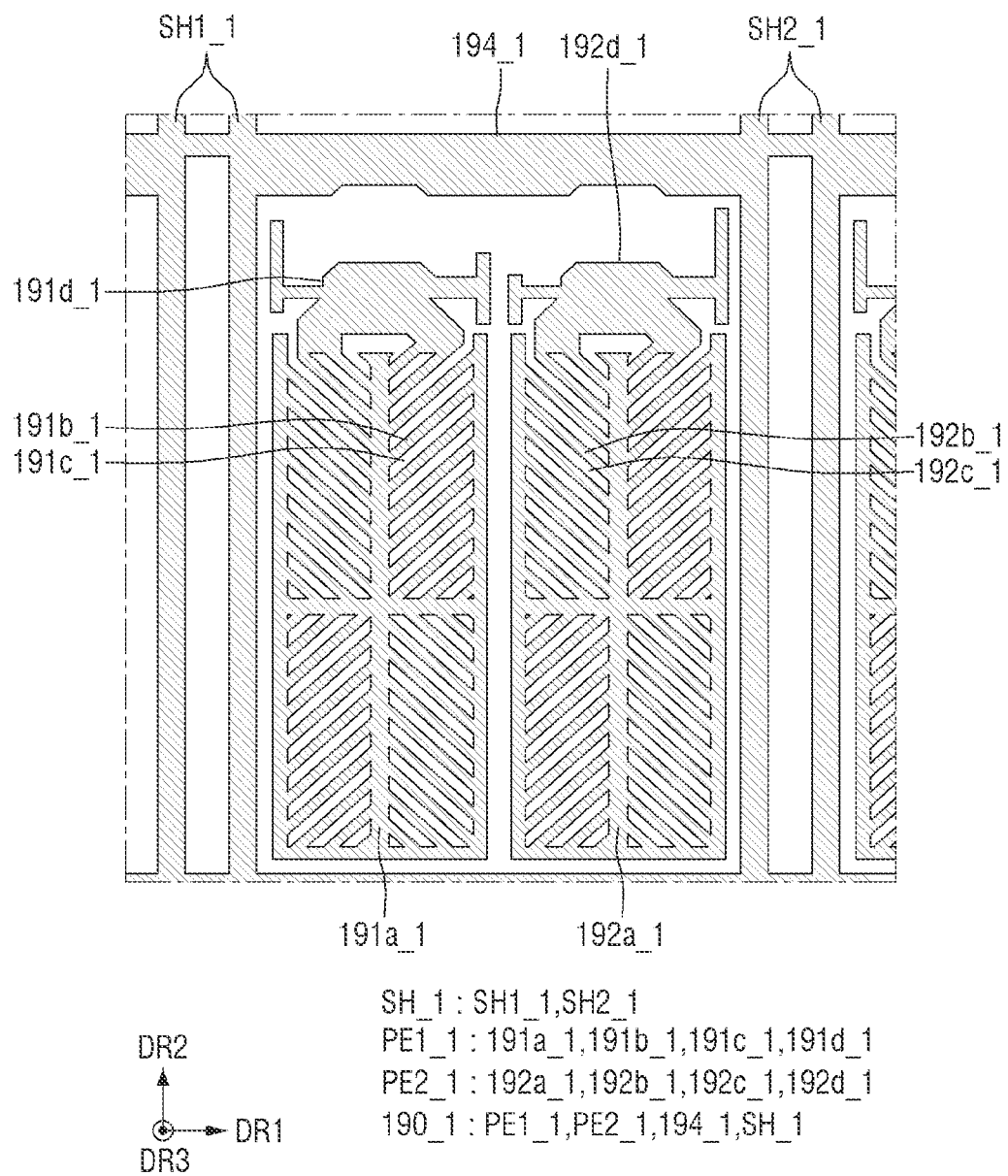
FIG. 20 is a layout view of a pixel electrode layer of FIG. 17.
Figure 21:
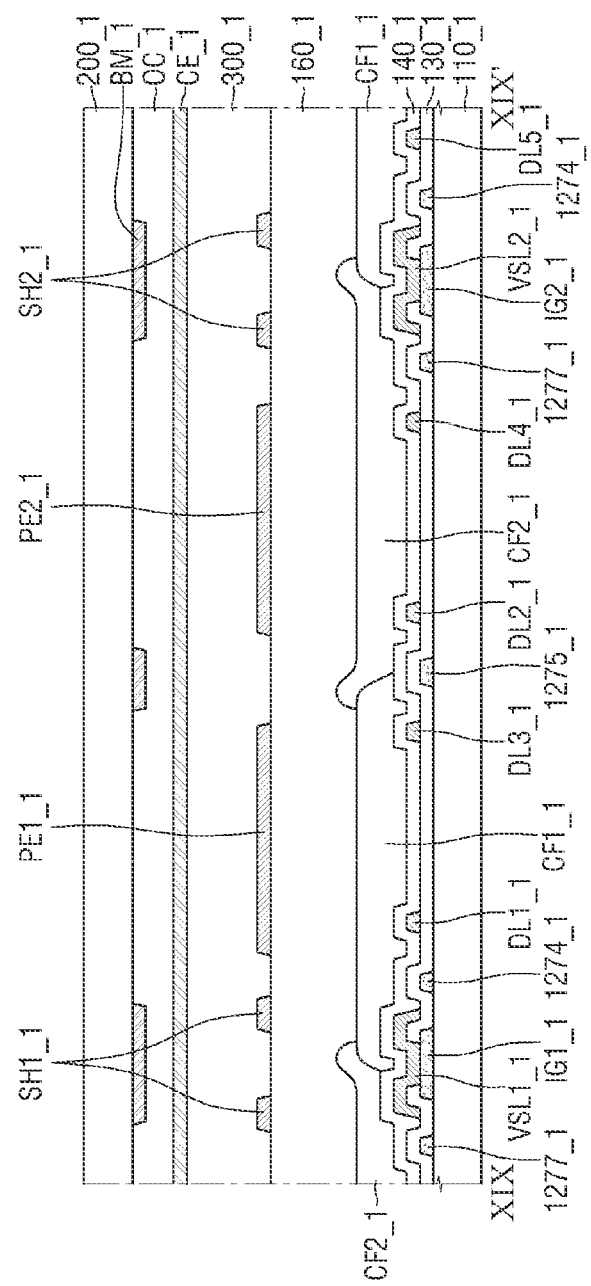
FIG. 21 is a cross-sectional view taken along line XIX-XIX' of FIG. 17.

FIG. 14 is a plan view of a display device 1_1 according to an embodiment of the present disclosure. FIG. 15 is an equivalent circuit diagram of some pixels of FIG. 14. FIG. 16 is a plan view illustrating an area R of FIG. 14. FIG. 17 is an enlarged layout view illustrating first and second pixels. FIG. 18 is a layout view illustrating a gate conductive layer of FIG. 17. FIG. 19 is a layout view illustrating a data conductive layer of FIG. 17. FIG. 20 is a layout view of a pixel electrode layer of FIG. 17. FIG. 21 is a cross-sectional view taken along line XIX-XIX' of FIG. 17.

Referring to FIGS. 14 through 21, the display device 1_1 differs from its counterpart of FIGS. 1 through 11 in that in order to reduce the delay and/or the attenuation of a scan signal Sn_1, a display panel DP is divided into four sections in a first direction DR1, that four driving controllers SPCB_1 are disposed in the four sections, and that eight integrated drivers DIC are connected to each of the four driving controllers SPCB_1. Elements in FIGS. 14-21 that are similar to elements in FIGS. 1-11 are labeled with similar reference numbers with the addition of "_1" unless discussed as being different below.

The display device 1_1 also differs from its counterpart of FIGS. 1 through 11 in that two pixel columns PXC_1 are disposed between each pair of adjacent vertical scan lines VSL_1, and that four data lines DL_1 are disposed between each pair of vertical scan lines VSL_1. The data lines DL_1 may be disposed on first and second sides, e.g., the right and left sides, in the first direction DR1, of each of the pixel columns PXC_1. For example, a first data line DL1_1 may be disposed on a second side, in the first direction DR1, of a first pixel column PXC1_1, and a third data line DL31 may be disposed on a first side, in the first direction DR1, of the first pixel column PXC1_1. A second data line DL2_1 may be disposed on a second side, in the first direction DR1, of the second pixel column PXC2_1, and a fourth data line DL4_1 may be disposed on a first side, in the first direction DR1, of the second pixel column PXC2_1. Two data lines DL_1 may be disposed on both sides, in the first direction DR1, of each of the pixel columns PXC_1. That is, the number of data lines DL_1 may be twice the number of pixel columns PXC_1. Pixels PX_1 included in the first pixel column PXC1_1 may receive a first data signal D1_1 from the first data line DL1_1, and pixels PX_1 included in the second pixel column PXC2_1 may receive a second data signal D2_1 from the second data line DL2_1.

In a region covered by each integrated driver DIC_1, the number of vertical scan lines VSL_1 may be the same as the sum of the number of gate channels GC_1 and the number of dummy lines DM_1. For example, if there are 270 first connecting lines on each integrated driver DIC_1, 270 gate channels GC_1, 90 dummy lines DM_1, and 360 vertical scan lines VSL_1 may be disposed in the region covered by each integrated driver DIC.

In this case, half the dummy lines DM_1 may be disposed on a first side, in the first direction DR1, of the array of the gate channels GC_1, and the other half may be disposed on a second side, in the first direction DR1, of the array of the gate channels GC_1. That is, 45 dummy lines DM_1 may be disposed on the first side, in the first direction DR1, of the array of the gate channels GC_1, and 45 dummy lines DM_1 may be disposed on the second side, in the first direction DR1, of the array of the gate channels GC_1.

The data lines DL_1 may be connected to second integrated circuits SDIC_1 of each integrated driver DIC_1. Thus, in the region covered by each integrated driver DIC_1, the number of data lines DL_1 may be the same as the number of second connecting lines disposed on the corresponding integrated driver DIC_1. For example, if two second integrated circuits SDIC_1 are disposed on each integrated driver DIC_1 and 720 second connecting lines extend from each of the two second integrated circuits SDIC_1, the number of data lines DL_1 disposed in the region covered by the corresponding integrated driver DIC_1 may be 1440. That is, the number of pixel columns PXC_1 is twice the number of vertical scan lines VSL_1, and the number of data lines DL_1 may be four times the number of vertical scan lines VSL_1.

The color of each of first and second color filters CF1_1 and CF2_1 of the first and second pixel columns PXC1_1 and PXC2_1, which are disposed between first and second vertical scan lines VSL1_1 and VSL2_1, may be one of red, green, and blue.

Since shield electrodes SH1_1 and SH2_1 to which a DC voltage that is substantially the same as a common voltage Vcom is applied are disposed in a pixel electrode layer 190_1 of the display device 1_1, shielding capacitance Csh can be generated between the shield electrodes SH1_1 and SH2_1 and outer extended portions 1274_1 and 1277_1 of a sustain line 1271, and as a result, parasitic capacitance Cgs, which is generated between pixel electrodes PE_1 and the vertical scan lines VSL_1, can be minimized. Accordingly, a kickback voltage Vkb can be minimized. Therefore, a display device having first integrated circuits GDIC_1 and second integrated circuits SDIC_1 attached on one side of a display panel DP_1 and thus having a small non-display area NDA_1 can be provided.

Figure 22:
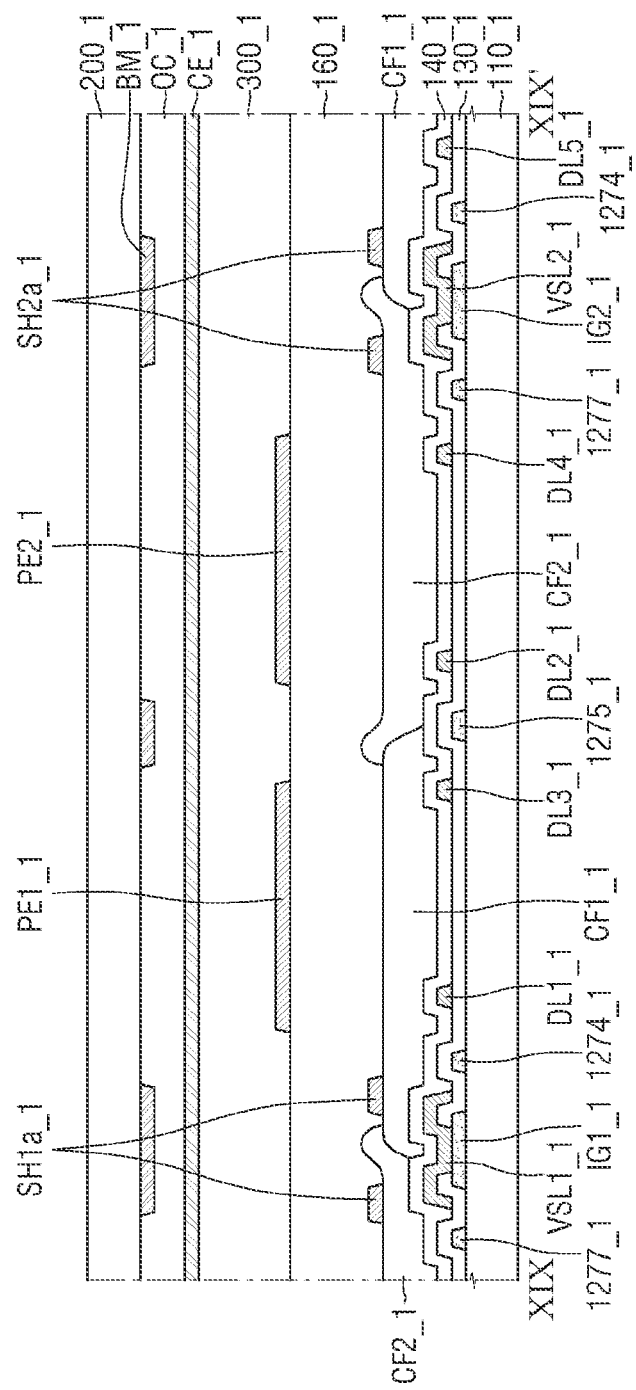
FIG. 22 is a cross-sectional view of a display device according to an embodiment of the present disclosure.

FIG. 22 is a cross-sectional view of a display device according to an embodiment of the present disclosure.

Referring to FIG. 22, a display device 1_1 differs from its counterpart of FIGS. 14 through 21 in that shield electrodes SH1a_1 and SH2a_1 are not included in a pixel electrode layer 190_1, but are disposed on color filters CF_1. Specifically, the shield electrodes SH1a_1 and SH2a_1 may be disposed on the color filters CF_1, and a planarization layer 160_1 may be disposed on the shield electrodes SH1a_1 and SH2a_1. The shield electrodes SH1a_1 and SH2a_1, like the pixel electrode layer 190_1, may be formed of a transparent conductive material. For example, the shield electrodes SH1a_1 and SH2a_1 may include a transparent conductive oxide film of ITO, IZO, or ZO.

The structuring of the shield electrodes SH1a_1 and SH2a_1 may be the same as the structuring of the shield electrodes SH1_1 and SH2_1 of FIGS. 14 through 21, and thus, a detailed description of the structuring of the shield electrodes SH1a_1 and SH2a_1 will be omitted.

Since the shield electrodes SH1a_1 and SH2a_1, to which a DC voltage that is substantially the same as a common voltage Vcom is applied, are disposed in the pixel electrode layer 190_1 of the display device 1_1, shielding capacitance Csh can be generated between the shield electrodes SH1a_1 and SH2a_1 and outer extended portions 1274_1 and 1277_1 of a sustain line 127_1, and as a result, parasitic capacitance Cgs, which is generated between pixel electrodes PE_1 and vertical scan lines VSL_1, can be minimized. Accordingly, a kickback voltage Vkb can be minimized. Therefore, a display device having first integrated circuits GDIC_1 and second integrated circuits SDIC_1 attached on one side of a display panel DP_1 and thus having a small non-display area NDA_1 can be provided.

Advantageous effects according to the embodiments are not limited to that mentioned above, and various other advantageous effects are incorporated herein.

Embodiments of the present disclosure have been described above with reference to the accompanying drawings, but those of ordinary skill in the art to which the present disclosure pertains should understand that the present disclosure may be practiced in other specific forms without changing the technical idea or essential features of the present disclosure. Therefore, the embodiments described above should be understood as being illustrative in all aspects instead of limiting.

What is claimed is:
1. A display device comprising:
first and second horizontal scan lines extending in a first direction;
a first vertical scan line extending in a second direction that intersects the first direction;
first, second, third, and fourth data lines extending in the second direction, and sequentially arranged along the first direction;

a first switching element connected to the first horizontal scan line and the first data line;

a second switching element connected to the first horizontal scan line and the third data line;

a third switching element connected to the second horizontal scan line and the second data line;

a fourth switching element connected to the second horizontal scan line and the fourth data line;

a first pixel electrode connected to the first switching element;

a second pixel electrode connected to the second switching element;

a third pixel electrode connected to the third switching element;

a fourth pixel electrode connected to the fourth switching element;

island-type electrodes extending in the second direction, disposed in the same layer as the first and second horizontal scan lines, and overlapping with the first vertical scan line in a thickness direction;

a first shield electrode extending in the second direction and covering a first edge of the first vertical scan line; and a second shield electrode spaced apart from the first shield electrode and covering a second edge of the first vertical scan line, wherein the first vertical scan line electrically connects the first horizontal scan line and the second horizontal scan line.

2. The display device of claim 1, further comprising:

third and fourth horizontal scan lines; and a second vertical scan line electrically connected to the third and fourth horizontal scan lines, wherein the first, second, third, and fourth horizontal scan lines are sequentially arranged along the second direction.

3. The display device of claim 1, further comprising:

a sustain line extending in the second direction and spaced apart from the first and second horizontal scan lines and the island-type electrodes.

4. The display device of claim 3, wherein the sustain line does not overlap with one of the first, second, third, and fourth pixel electrodes in the thickness direction.

5. The display device of claim 1, wherein the island-type electrodes are spaced apart from the first and second horizontal scan lines.

6. The display device of claim 1, wherein the island-type electrodes and the first vertical scan line are electrically connected via contact holes.

* * * * *